(12) United States Patent
Aoki

(10) Patent No.: US 10,460,193 B2
(45) Date of Patent: Oct. 29, 2019

(54) IMAGE PROCESSING APPARATUS, IMAGE PROCESSING METHOD, AND COMPUTER-READABLE STORAGE MEDIUM

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 103 days.

(21) Appl. No.: 15/803,972

(22) Filed: Nov. 6, 2017

(65) Prior Publication Data
US 2018/0150712 A1     May 31, 2018

(30) Foreign Application Priority Data

Nov. 28, 2016  (JP) ................................ 2016-230188

(51) Int. Cl.
| | | |
|---|---|---|
| G06K 9/42 | (2006.01) | |
| G06T 7/507 | (2017.01) | |
| G06K 9/00 | (2006.01) | |

(52) U.S. Cl.
CPC .......... *G06K 9/42* (2013.01); *G06K 9/00013* (2013.01); *G06K 9/00033* (2013.01);
(Continued)

(58) Field of Classification Search
CPC .. G06K 9/42; G06K 9/00912; G06K 9/00033; G06K 9/00067; G06K 9/00013; G06K 2009/00932; G06K 9/00382; G06T 7/507; G06T 2207/10028; G06T 2207/30196
See application file for complete search history.

(56) References Cited

U.S. PATENT DOCUMENTS

2015/0254492 A1    9/2015  Aoki
2016/0267316 A1*   9/2016  Aoki .................. G06K 9/00067

FOREIGN PATENT DOCUMENTS

| EP | 3067824 A1 | 9/2016 |
| JP | 2007-213199 | 8/2007 |
| JP | 2015-170322 | 9/2015 |

OTHER PUBLICATIONS

EESR—Extended European Search Report dated Apr. 6, 2018 issued with respect to the corresponding European Patent Application No. 17199878.4.

* cited by examiner

*Primary Examiner* — Qian Yang
(74) *Attorney, Agent, or Firm* — Fujitsu Patent Center

(57) ABSTRACT

An image processing apparatus approximates a three-dimensional shape of a target object, acquired from an image of of the target object, by a quadric surface, applies a plane expansion process that expands the quadric surface into an expansion plane, to data of the image, computes corresponding points before and after the plane expansion process, and generates normalized data of the image from the corresponding points that are computed. The corresponding points are computed based on a point on a straight line of the expansion plane in contact with a point on the quadric surface and corresponding to a reference point on the target object, and an intersection point of an imaginary straight line, passing through the point on the straight line and extending in a direction of a first normal vector with respect to the straight line, and a quadratic curve of the quadric surface.

20 Claims, 15 Drawing Sheets

(52) U.S. Cl.
CPC ..... *G06K 9/00067* (2013.01); *G06K 9/00912* (2013.01); *G06T 7/507* (2017.01); *G06K 9/00382* (2013.01); *G06K 2009/00932* (2013.01); *G06T 2207/10028* (2013.01); *G06T 2207/30196* (2013.01)

IMAGE PROCESSING APPARATUS, IMAGE PROCESSING METHOD, AND COMPUTER-READABLE STORAGE MEDIUM

CROSS-REFERENCE TO RELATED APPLICATIONS

This application is based upon and claims the benefit of priority of the prior Japanese Patent Application No. 2016-230188, filed on Nov. 28, 2016, the entire contents of which are incorporated herein by reference.

FIELD

The embodiments discussed herein are related to an image processing apparatus, an image processing method, and a computer-readable storage medium.

BACKGROUND

A palm vein authentication captures a palm vein pattern by a camera using near-infrared light, and performs a personal authentication by matching the captured palm vein pattern to a registered vein pattern. The palm vein authentication is an example of a biometric authentication technique. The palm vein authentication can perform a noncontact biometric authentication.

When registering the vein pattern, it is possible in many cases to capture the palm vein pattern in a state in which the palm is stably supported on a guide member. On the other hand, when authenticating the vein pattern, the palm vein pattern may be captured in an environment in which no guide member is provided. For example, compared to the time when the vein pattern is registered, the palm at the time when authenticating the vein pattern may be closed or excessively open.

Even in a case in which the authentication is performed in the environment in which the guide member is provided, a user may not necessarily place the user's palm on the guide member each time at the same orientation (or posture). In such a case, compared to the time when the vein pattern is registered, the palm at the time when authenticating the vein pattern may be closed or excessively open, for example.

When the orientation of the palm at the time of the registration and the orientation of the palm at the time of the authentication differ, an authentication error may cause a false rejection to be generated. For this reason, at the time of the authentication, it is desirable to normalize a three-dimensional shape of the captured palm.

Conventionally, there is a proposed method that normalizes the palm vein pattern by correcting an inclination or a rotation of the palm at the time of the authentication. However, even when the palm vein pattern is normalized by correcting the inclination or the rotation of the palm, it is difficult to normalize the palm vein pattern by correcting, with a high accuracy, a distortion in the three-dimensional shape of the palm that is captured at the time of the authentication, in the case in which the palm is closed or excessively open compared to the palm at the time of the registration. In addition, when an exclusive algorithm is employed to normalize the palm vein pattern by correcting the closed or excessively open palm in order to cope with the palm that is closed or excessively open compared to the palm at the time of the registration, the algorithm becomes complex. However, when the algorithm is complex, it is difficult to correct, at a high speed, the distortion in the three-dimensional shape of the palm that is closed or excessively open and is captured at the time of the authentication. On the other hand, when the algorithm is simplified in order to enable a high-speed normalization process, it is difficult to normalize the palm vein pattern by correcting, with a high accuracy, the distortion in the three-dimensional shape of the palm that is closed or excessively open and is captured at the time of the authentication.

In a case in which a target object is captured using illumination light or natural light other than the near-infrared light, a distortion may be generated in the three-dimensional shape of the captured target object depending on the orientation (or posture) of the target object. Accordingly, even in such a case, it is desirable to normalize the image of the target object by correcting the distortion in the three-dimensional shape of the captured target object, similarly to the above described case in which the palm vein pattern is captured. Examples of capturing the target object using the illumination light other than the near-infrared light includes capturing a palm-print pattern, and capturing a palm-reading pattern (or lines of the palm), for example.

A technique for approximating the three-dimensional shape by a quadric surface, and a SFS (Shape From Shading) technique for recognizing the three-dimensional shape of the target object from a luminance distribution of the image of the target object captured by illuminating the target object by the illumination light are proposed in Japanese Laid-Open Patent Publications No. 2007-213199 and No. 2015-170322, for example.

Conventionally, it is difficult to normalize the palm vein pattern by correcting, with a high accuracy, the distortion in the three-dimensional shape of the palm that is closed or excessively open and is captured at the time of the authentication.

SUMMARY

Accordingly, it is an object in one aspect of the embodiments to provide an image processing apparatus, an image processing method, and a computer-readable storage medium, that can normalize the palm vein pattern by correcting, with a high accuracy, the distortion in the three-dimensional shape of the palm that is closed or excessively open and is captured at the time of the authentication.

According to one aspect of the embodiments, an image processing apparatus includes a storage configured to store a program; and a processor configured to execute the program and perform a process including approximating a three-dimensional shape of a target object, acquired from an image of of the target object, by a quadric surface, applying a plane expansion process that expands the quadric surface into an expansion plane, to data of the image, computing corresponding points before and after the plane expansion process, and generating normalized data of the image from the corresponding points that are computed, wherein the computing the corresponding points computes the corresponding points, based on a point on a straight line of the expansion plane in contact with a point on the quadric surface and corresponding to a reference point on the target object, and an intersection point of a first imaginary straight line, passing through the point on the straight line and extending in a direction of a first normal vector with respect to the straight line, and a quadratic curve of the quadric surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An image processing apparatus, an image processing method, and a computer-readable storage medium having stored therein a program disclosed herein approximates a three-dimensional shape of a target object, acquired from an image of of the target object, by a quadric surface, and applies a plane expansion process that expands the quadric surface into an expansion plane, to data of the image. Further, corresponding points before and after the plane expansion process are computed, and normalized data of the image is generated from the corresponding points that are computed. The corresponding points are computed based on a point on a straight line of the expansion plane in contact with a point on the quadric surface and corresponding to a reference point on the target object, and an intersection point of a first imaginary straight line, passing through the point on the straight line and extending in a direction of a first normal vector with respect to the straight line, and the quadratic curve of the quadric surface.

Preferred embodiments of the present invention will be described with reference to the accompanying drawings.

A description will now be given of an image processing apparatus, an image processing method, and a computer-readable storage medium in each embodiment according to the present invention.

Figure 1:
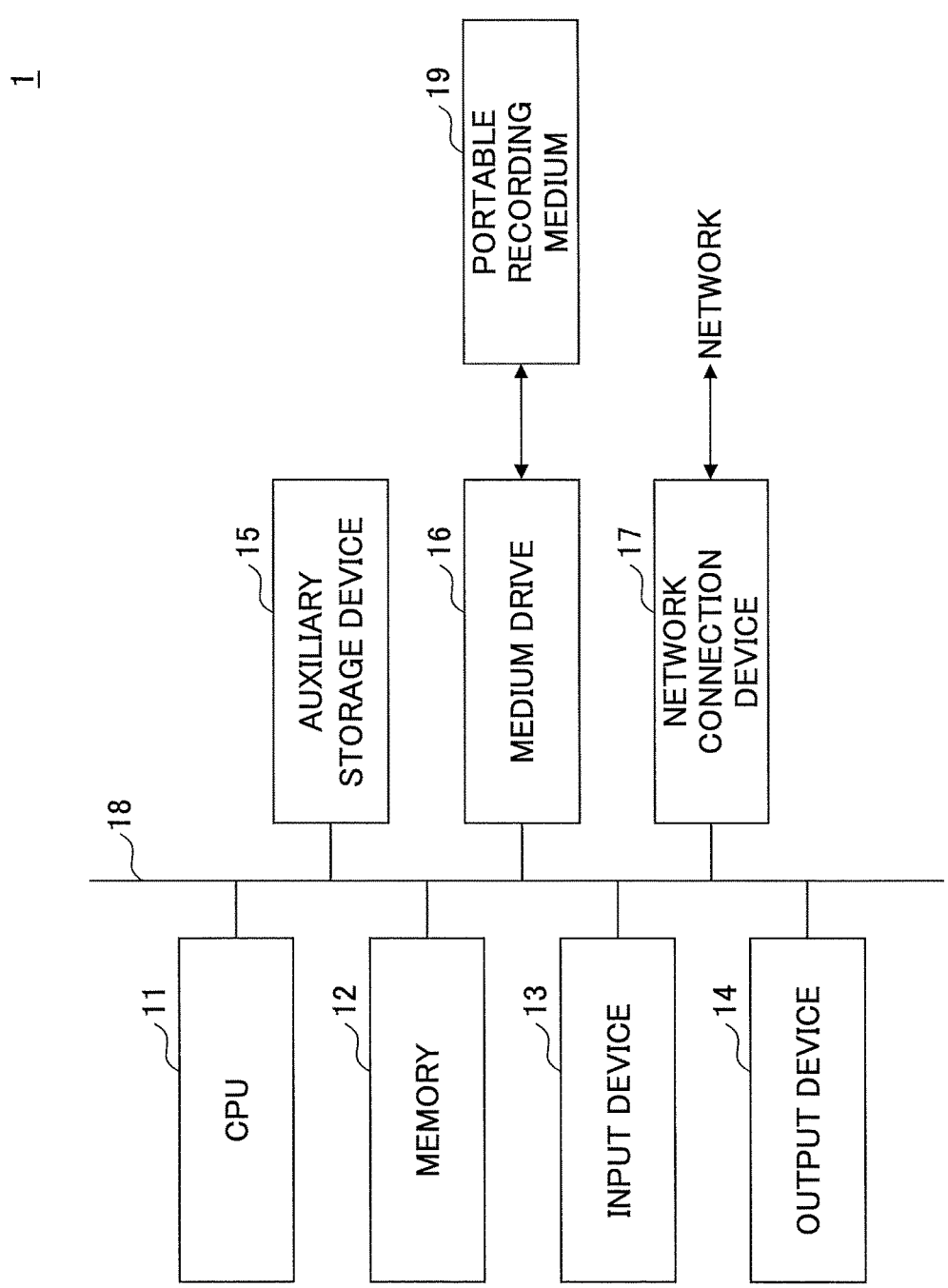
FIG. 1 is a block diagram illustrating an example of a hardware configuration of an image processing apparatus in one embodiment.

FIG. 1 is a block diagram illustrating an example of a hardware configuration of an image processing apparatus in one embodiment. A computer 1 illustrated in FIG. 1 includes a CPU (Central Processing Unit) 11, a memory 12, an input device 13, an output device 14, an auxiliary storage device 15, a medium drive 16, and a network connection device 17 that are mutually connected via a bus 18. An imaging apparatus, that will be described later, may be connected to the bus 18, or may be connected to the network connection device 17 via a communication network. The communication network may be a cable network, a wireless network, or a combination of a cable network and a wireless network.

The memory 12 may be formed by a semiconductor memory, such as a ROM (Read Only Memory), a RAM (Random Access Memory), a flash memory, or the like, for example. The memory 12 may store one or more programs and data that are used when performing an image processing, a biometric authentication process, or the like. The memory 12 may form a storage device that will be described later.

The CPU 11 is an example of a processor that executes one or more programs stored in the memory 12, for example. The CPU 11 may execute the one or more programs to perform functions of a control unit 21, a SFS computation unit 25, a feature extraction unit 26, a matching unit 27, a normalization unit 28-1, or the like of a biometric authentication apparatus 2-1 illustrated in FIG. 7 that will be described later. The CPU 11 may execute the one or more programs to perform functions of a control unit 21, a SFS computation unit 25, a feature extraction unit 26, a matching unit 27, a normalization unit 28-2, or the like of a biometric authentication apparatus 2-2 illustrated in FIG. 14 that will be described later.

The input device 13 may be formed by a keyboard, a pointing device, or the like, for example. The input device 13 may be used by an operator or a user to input instructions, information, or the like to the computer 1. The input device 13 may include a capturing device that captures images and inputs the images to the computer 1. The output device 14 may be formed by a display device, a printer, a speaker, or the like, for example. The output device 14 may be used to output inquiries, instructions, processed results, or the like with respect to the operator or the user. The processed results may include a corrected image, an authentication result of a biometric authentication process, or the like.

The auxiliary storage device 15 may be formed by a magnetic disk drive, an optical disk drive, a magneto-optical disk drive, a tape drive, or the like, for example. The auxiliary storage device 15 may also be formed by a hard disk drive, a flash memory, or the like, for example. The computer 1 may store the one or more programs and the data in the auxiliary storage device 15, and load the one or more programs and the data to the memory 12 when executing the one or more programs, for example. The auxiliary storage device 15 may form the storage device that will be described later.

The medium drive 16 may drive a portable recording medium 19, and make access to stored contents of the portable recording medium 19. The portable recording medium 19 may be formed by a memory device, a flexible disk, an optical disk, a magneto-optical disk, or the like, for example. The portable recording medium 19 may also be formed by a CD-ROM (Compact Disk-Read Only Memory), a DVD (Digital Versatile Disk), a USB (Universal Serial Bus) memory, or the like, for example. The operator or the user may store the one or more programs and the data in the portable recording medium 19, and load the one or more programs and the data to the memory 12 when executing the one or more programs, for example. The portable recording medium 19 may form the storage device that will be described later.

A computer-readable storage medium which stores the one or more programs and the data that are used when performing the image processing, the biometric authentication process, or the like, is a non-transitory recording medium, such as the memory 12, the auxiliary storage device 15, and the portable recording medium 19.

The network connection device 17 is an example of a communication interface that is connected to a communication network, such as a LAN (Local Area Network), a WAN (Wide Area Network), or the like, and perform a data conversion associated with the communication. The computer 1 may receive the one or more programs and the data from an external apparatus via the network connection device 17, and load the one or more programs and the data to the memory 12 when when executing the one or more programs, for example.

The computer 1 may receive a process request from a user terminal via the network connection device 17, and perform the image processing, the biometric authentication process, or the like. In addition, the computer 1 may send the processed result of the image processing, the biometric authentication process, or the like to the user terminal via the network connection device 17.

The computer 1 does not require all of the constituent elements illustrated in FIG. 1, and some of the constituent elements may be omitted according to the usage, conditions, or the like of the computer 1. For example, in a case in which the computer 1 receives the process request from the user terminal via the communication network, the input device 13 and the output device 14 may be omitted. Further, in a case in which the portable recording medium 19 or the communication network is not used, the medium drive 16 or the network connection device 17 may be omitted.

In a case in which the computer 1 is a portable terminal having a communication function, such as a smartphone, for example, the computer 1 may include devices for performing the communication function, such as a microphone and a speaker, and may also include an imaging device such as a camera.

In one embodiment, when expanding, in a plane, a three-dimensional shape of a target object that is acquired from an image of the target object captured by the camera, corresponding points that will be described later are obtained using normal vectors. The target object is the user's palm, for example. In the case in which the palm vein authentication is performed, the palm vein pattern is captured by the camera using near-infrared light, and the captured palm vein pattern is matched to a registered vein pattern to perform a personal authentication.

For the sake of convenience, a description will be given in the following of a case in which the target object to be captured by the camera is the user's palm.

Figure 2:
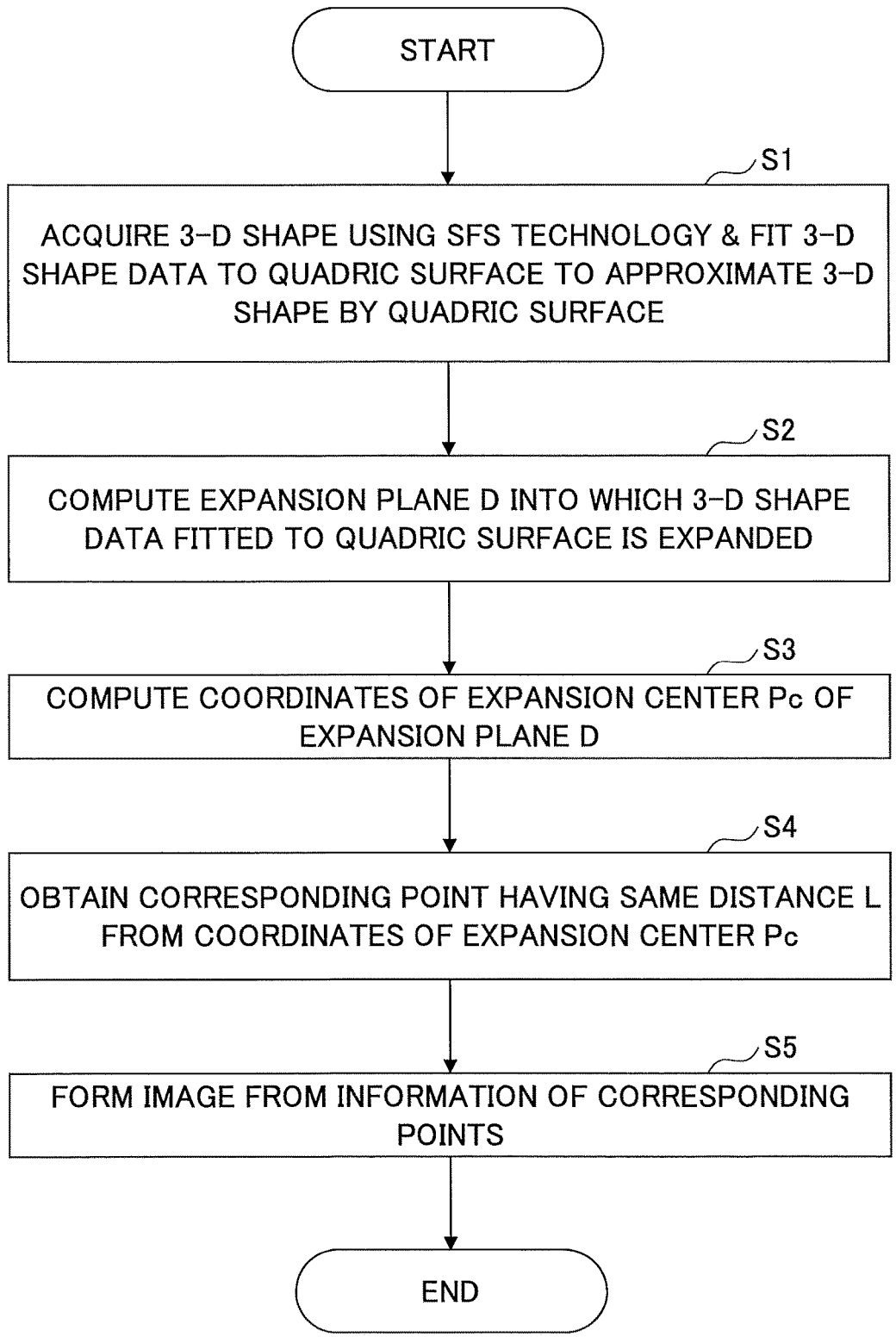
FIG. 2 is a flow chart for explaining an example of a three-dimensional shape correction process.

First, a description will be given of a process that corrects a three-dimensional shape of the palm. FIG. 2 is a flow chart for explaining an example of a three-dimensional shape correction process. The three-dimensional shape correction process illustrated in FIG. 2 may be performed by the CPU 11 illustrated in FIG. 1, for example.

In step S1 illustrated in FIG. 2, the CPU 11 acquires the three-dimensional shape of the palm captured by the camera using the SFS technique, and performs a fitting to fit data of the three-dimensional shape (hereinafter also referred to as "three-dimensional shape data") of the palm to a quadric surface, to approximate the three-dimensional shape of the palm by the quadric surface. In step S2, the CPU 11 computes an expansion plane D illustrated in FIG. 3 that will be described later, that expands the the three-dimensional shape data of the palm fitted to the quadric surface. In step S3, the CPU 11 computes coordinates of an expansion center $P_c$ of the expansion plane D. The coordinates of the expansion center $P_c$ correspond to coordinates of a center of the palm, for example. In step S4, the CPU 11 obtains corresponding points on a quadratic curve of the quadric surface and on a straight line of the expansion plane D, that are located at a distance L from the coordinates of the expansion center $P_c$ and equidistant from the expansion center $P_c$. In step S5, the CPU 11 forms an image from information of the corresponding points.

Figure 3:
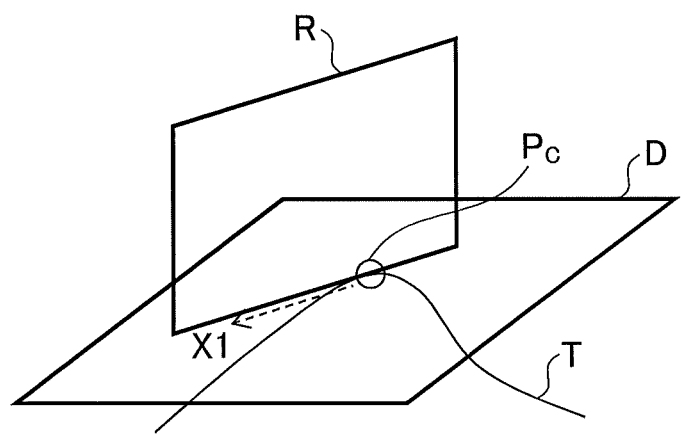
FIG. 3 is a diagram for explaining an example of setting a cross-sectional plane in a plane expansion process.
Figure 4:
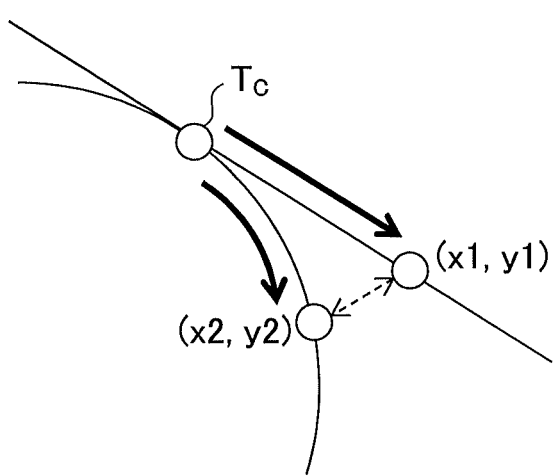
FIG. 4 is a diagram for explaining an example of a corresponding point computation method when performing the plane expansion.

In step S4, the CPU 11 makes a correspondence between a quadric surface T of the palm and the expansion plane D, on a plane that is cut out by a predetermined cross-sectional plane R illustrated in FIG. 3 when performing a plane expansion process. FIG. 3 is a diagram for explaining an example of setting a cross-sectional plane in the plane expansion process. When approximating the three-dimensional shape of the palm by the quadric surface, the palm is obtained as an ellipse (or a hyperbola, or a parabola) on the cross-sectional plane R, as illustrated in FIG. 4. FIG. 4 is a diagram for explaining an example of a corresponding point computation method when performing the plane expansion. For this reason, in order to compute corresponding points $(x_1, y_1)$ and $(x_2, y_2)$, an incomplete elliptic integral of the second kind is required to compute a circumference of the ellipse, and the computations become complex.

Accordingly, it is desirable to compute the corresponding points at a high speed when performing the three-dimensional shape correction process described above. In order to expand the quadric surface (that is, the closed, rounded palm) into the expansion plane (that is, the open, flat palm) by the three-dimensional shape correction process, it is necessary to obtain the corresponding points that are on the quadratic curve of the quadric surface, and on the straight line of the expansion plane and in contact with a point on the quadratic curve corresponding to a reference point on the target object (that is, the palm). In addition, when performing the biometric authentication by an embedded device, for example, it is desirable to perform the computation process at a high speed because the computation process is performed by a CPU having a lower computing power or processing capability compared to that of a PC (Personal Computer), for example.

As illustrated in FIG. 4, when approximating the three-dimensional shape of the palm by the quadric surface, the condition that the distance from the expansion center $P_c$ is constant is used, and for this reason, it is necessary to compute the distance on the quadratic curve of the quadric surface. More particularly, because the point on the ellipse having the distance from the expansion center $P_c$ amounting to a predetermined length L is computed using Newton's method, the computation process becomes complex. Consequently, the amount of the required computations becomes large, and it is difficult to perform the computation process at a high speed.

On the other hand, one embodiment obtains, as corresponding points, a point on a straight line of an expansion plane, in contact with at least a point on a quadric surface, corresponding to a reference point on a target object, and an intersection point of an imaginary straight line that passes through the point on the straight line and extends in a direction of a normal vector, and a quadratic curve of the quadric surface. A first corresponding point computation method and a second corresponding computation method that may be employed when performing a plane expansion, will be described with reference to FIGS. 5 and 6.

Figure 5:
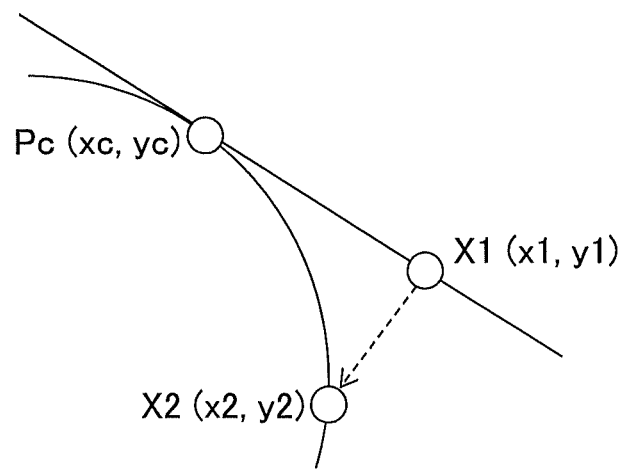
FIG. 5 is a diagram for explaining a first corresponding point computation method when performing the plane expansion.

FIG. 5 is a diagram for explaining a first corresponding point computation method when performing the plane expansion. The first corresponding point computation method uses the normal vector of the straight line of the expansion plane.

One embodiment obtains the straight line of the expansion plane D in contact with the point on the quadric surface and corresponding to the reference point on the target object, and obtains a point $X_2$ ($x_2$, $y_2$) on the quadratic curve of the quadric surface and corresponding to a point $X_1$ ($x_1$, $y_1$) on the straight line in the following manner. First, a normal vector $v_1$ perpendicular to the straight line and passing through a target point $X_1$ ($x_1$, $y_1$) on the straight line is obtained, to obtain the imaginary straight line indicated by a dotted line in FIG. 5 and extending in the direction of the normal vector $v_1$. An intersection point of the imaginary straight line that is obtained in this manner and the quadratic curve is regarded as a corresponding point $X_2$ ($x_2$, $y_2$) corresponding to the target point $X_1$ ($x_1$, $y_1$). The intersection point of the imaginary straight line and the quadratic curve can be obtained from a quadratic equation.

A description will be given of an example of the method of computing the point $X_2$ ($x_2$, $y_2$). When a vector extending from an expansion center $P_c$ ($x_c$, $y_c$) towards the target point $X_1$ ($x_1$, $y_1$) is denoted by $n_1$, this vector $n_1$ can be obtained from the following formula (1).

$$n_1 = \begin{pmatrix} x_1 - x_c \\ y_1 - y_c \end{pmatrix} \quad (1)$$

The imaginary straight line (indicated by the dotted line in FIG. 5) passing through the target point $X_1$ ($x_1$, $y_1$) and extending in a normal direction at the target point $X_1$ ($x_1$, $y_1$) can be represented by the following formula (2), where $p=(x_1-x_c)$, $q=(y_1-y_c)$, and $r=-(x_1-x_c)x_1-(y_1-y_c)y_1$.

$$px+qy+r=0 \quad (2)$$

The quadratic curve that is an expansion target can be represented by the following formula (3), where "a", "b", "c", "d", "e", and "f" denote coefficients.

$$ax^2+by^2+cxy+dx+ey+f=0 \quad (3)$$

Next, an intersection point of the imaginary straight line represented by the formula (2) and the quadratic curve represented by the formula (3) is obtained. The following formula (4) is obtained when the formula of the imaginary straight line is solved for y and substituted into the formula of the quadratic curve, where p'=−p/q and r'=r/q.

$$(a+bp'^2+cp')x^2+(2bp'r'+cr'+d+ep')x+(br'^2+er'+f)=0 \quad (4)$$

x can be obtained as a solution to the quadratic equation represented by the following formula (5), where $A=a+bp'^2+cp'^2$, $B=2bp'r'+cr'+d+ep'$, and $C=br'^2+er'+f$.

$$Ax^2+Bx+C=0 \quad (5)$$

Generally, two solutions to the quadratic equation exist. In this example, a point closer to the target point $X_1$ ($x_1$, $y_1$) may be used as the solution to the quadratic equation represented by the formula (5).

Figure 6:
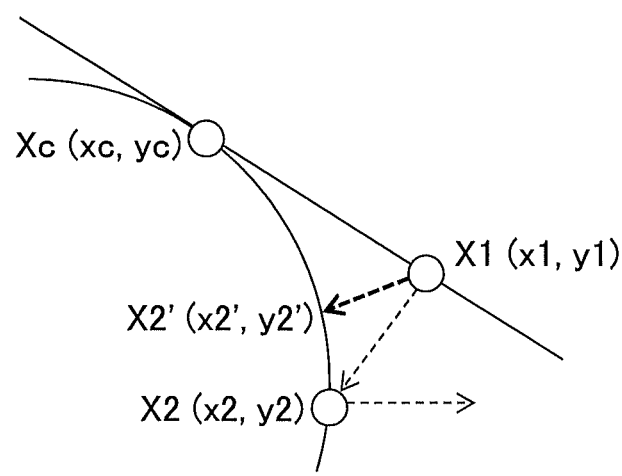
FIG. 6 is a diagram for explaining a second corresponding point computation method when performing the plane expansion.

FIG. 6 is a diagram for explaining a second corresponding point computation method when performing the plane expansion. The second corresponding point computation method uses the normal vector of the straight line of the expansion plane and a normal vector of the quadratic curve of the quadric surface.

According to the first corresponding point computation method, there is a tendency for the intersection point to deviate to a position farther away from the expansion center $P_c(x_c, y_c)$. This tendency occurs because the first corresponding point computation method uses only the normal vector of the straight line of the expansion plane, and ignores, for the sake of convenience, the normal vector (inclination) of the quadratic curve of the quadric surface. Hence, the second corresponding point computation method uses an average normal vector of the normal vector of the straight line of the expansion plane and the normal vector of the quadratic curve of the quadric surface, to compute the corresponding points. More particularly, the second corresponding point computation method performs the following process.

First, the corresponding point $X_2$ ($x_2$, $y_2$) on the quadratic curve of the quadric surface, obtained by the first corresponding point computation method described above, is regarded as a provisional corresponding point. Then, a normal vector $v_2$ at the provisional corresponding point $X_2$ ($x_2$, $y_2$) is obtained, and a final corresponding point $X_2'(x_2', y_2')$ is obtained using an average normal vector v of the normal vector $v_1$ and the normal vector $v_2$. More particularly, an imaginary straight line passing through the target point $X_1$ ($x_1$, $y_1$) and extending in a direction of the average normal vector v is obtained, and an intersection point $X_2'(x_2', y_2')$ of the imaginary straight line and the quadratic curve is obtained. This intersection point $X_2'(x_2', y_2')$ is the corresponding point $X_2'(x_2', y_2')$ obtained by the second corresponding point computation method.

Normal vectors $n_x$ and $n_y$ at a quadratic curve $S(x,y)=0$ can be obtained from the following formulas (6).

$$n_x=\{\partial S(x,y)\}/\partial x=2ax+cy+d$$

$$n_y=\{\partial S(x,y)\}/\partial y=2by+cx+e \quad (6)$$

The first corresponding point computation method is simple compared to the second corresponding point computation method. On the other hand, the amount of required computations of the second corresponding point computation method is large compared to that of the first corresponding point computation method. However, the accuracy of the second corresponding point computation method is higher than that of the first corresponding point computation method. In addition, the second corresponding point computation method may be applied repetitively.

By computing the corresponding points at a high speed using the first corresponding point computation method or the second corresponding point computation method described above, it becomes possible to perform the computation process at a high speed when making a biometric authentication such as the palm vein authentication.

FIRST EMBODIMENT

Figure 7:
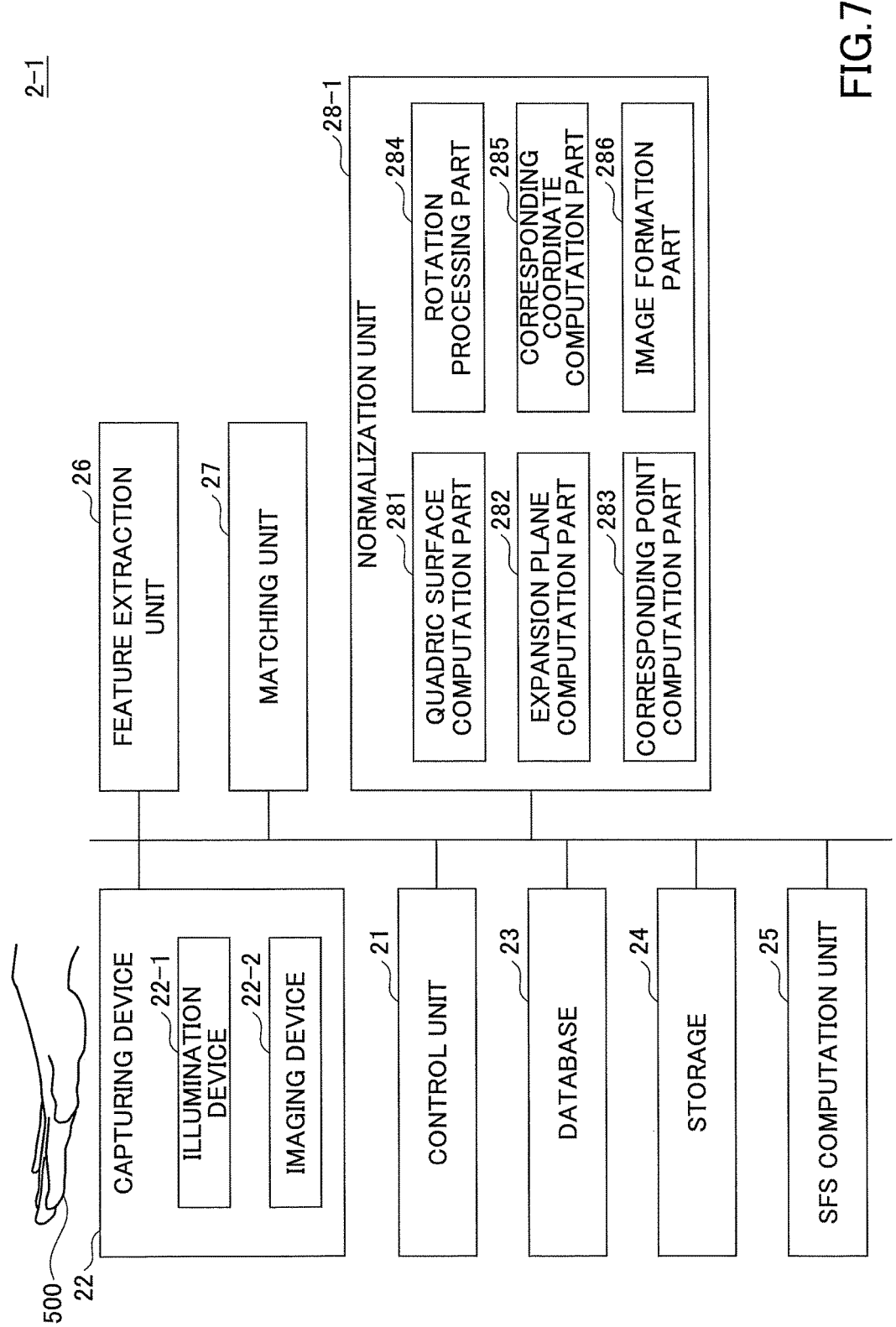
FIG. 7 is a block diagram illustrating an example of a configuration in a first embodiment.

Next, a description will be given of a first embodiment that applies a plane expansion process with respect to an image, by referring to FIG. 7. FIG. 7 is a block diagram illustrating an example of a configuration in a first embodiment. In the first embodiment, the plane expansion process is applied to the image of the captured palm when performing the palm vein authentication.

A biometric authentication apparatus 2-1 illustrated in FIG. 7 includes a control unit 21, a capturing device 22, a database 23, a storage 24, a SFS computation unit 25, a feature extraction unit 26, a matching unit 27, and a normalization unit 28-1. The normalization unit 28-1 includes a quadric surface computation part 281, an expansion plane computation part 282, a corresponding point computation part 283, a rotation processing part 284, a corresponding coordinate computation part 285, and an image formation part 286.

Processes performed by the control unit 21, the SFS computation unit 25, the feature extraction unit 26, the matching unit 27, and the normalization unit 28-1 may be executed by a processor, such as the CPU 1 or the like illustrated in FIG. 1, for example. The processes performed by the control unit 21, the SFS computation unit 25, the feature extraction unit 26, the matching unit 27, and the normalization unit 28-1 may be executed by one or more processors. For example, the processes performed by the control unit 21, the SFS computation unit 25, the feature extraction unit 26, and the matching unit 27 may executed by a first processor, and the process performed by the normalization unit 28-1 may be executed by a second processor that is different from the first processor. In this case, the first processor and the second processor may be mutually separate processors. The database 23 and the storage 24 may be formed by at least one of the memory 12, the auxiliary storage device 15, and the medium drive 16 illustrated in FIG. 1. The database 23 and the storage 24 may also be formed by a combination of two or more of the memory 12, the auxiliary storage device 15, and the medium drive 16. Each of the database 23 and the storage 24 may be formed by a combination of two or more devices selected from the memory 12, the auxiliary storage device 15, and the medium drive 16.

The control unit 21 controls operations of the entire biometric authentication apparatus 2-1. The capturing device 22 may be formed by a camera that captures the image of the target object, for example. The capturing device 22 may be included in the input device 13 illustrated in FIG. 1, for example. The capturing device 22 may have a known configuration including an illumination device 22-1 that illuminates the target object, and an imaging device 22-2. In a case in which the target object is a palm 500 and the biometric authentication apparatus 2-1 performs a palm vein authentication, the illumination device 22-1 of the capturing device 22 illuminates the palm 500 by near-infrared light.

The database 23 records data or the like used by the biometric authentication apparatus 2-1. More particularly, the database 23 may record the registered data or the like used for the biometric authentication. The registered data may sometimes be referred to as "registered templates" or "registration templates". The storage 24 may be used as an image buffer or the like to store the image or the like of the target object captured by the capturing device 22.

The SFS computation unit 25 applies the known SFS technique with respect to the image of the target object captured by the capturing device 22 (hereinafter also referred to as "input image"), to acquire three-dimensional shape data of the target object. The SFS computation unit 25 is an example of a device or a means for acquiring the three-dimensional shape data of the target object from the input image. The feature extraction unit 26 extracts, from the input image normalized by the normalization unit 28-1 that will be described later, feature data used for the biometric authentication. In the case in which the target object is the palm, the feature data are data representing authentication features such as the vein, the palm-print pattern, and the palm-reading pattern of the palm, for example. The matching unit 27 matches the feature data extracted by the feature extraction unit 26, and registered feature data that are examples of the registered data recorded in the database 23. The matching unit 26 outputs a similarity (or a matching extent) that indicates a degree of similarity of the feature data extracted by the feature extraction unit 26 and the registered feature data recorded in the database 23.

In the normalization unit 28-1, the quadric surface computation part 281 acquires the three-dimensional shape data of the target object by applying the known SFS technique by the SFS computation unit 25 with respect to the input image captured by the capturing device 22, and performs a fitting to fit the three-dimensional shape data of the target object to the quadric surface. Data may be appropriately decimated when performing the fitting. The quadric surface computation part 281 is an example of a device or a means for approximating the three-dimensional shape of the target object by the quadric surface. The expansion plane computation part 282 computes an expansion plane that is a target to which the quadric surface is expanded. The expansion plane computation part 282 is an example of a device or a means for applying the plane expansion process, that expands the quadric surface approximating the three-dimensional shape of the target object, to the expansion plane. The corresponding point computation part 283 is an example of a device or a means for computing the corresponding points before and after the plane expansion process, using the normal vector described above.

The rotation processing part 284 is an example of a device or a means for performing a rotation process when reducing data of the three-dimensional quadric surface into data of a two-dimensional plane. The rotation processing part 284 is also used when rotating the expansion plane into a final plane. A description of the final plane will be given later in the specification. The corresponding coordinate computation part 285 computes the correspondence of the image coordinates before and after the correction. The image formation part 286 is an example of a device or a means for generating a normalized input image from the corresponding points having the computed image coordinates.

[Coordinate System]

A description will be given of an optical model employed in one embodiment. A three-dimensional coordinate system (X, Y, Z) is assumed, and it is further assumed that the illumination device 22-1 (or light source) and a lens center of the capturing device 22 are located at a center of the three-dimensional coordinate system (X, Y, Z). It is also assumed that the lens has a focal distance F, and a pinhole camera model is taken into consideration. Coordinates on the image are represented by small letters, namely, (x, y). In the case of the pinhole camera model, a point (x, y) on the image has a relationship to the three-dimensional coordinate system (X, Y, Z) represented by the following formulas (7).

$$X=(Z/F)x, \quad Y=(Z/F)y \qquad (7)$$

[Matching Process]

Figure 8:
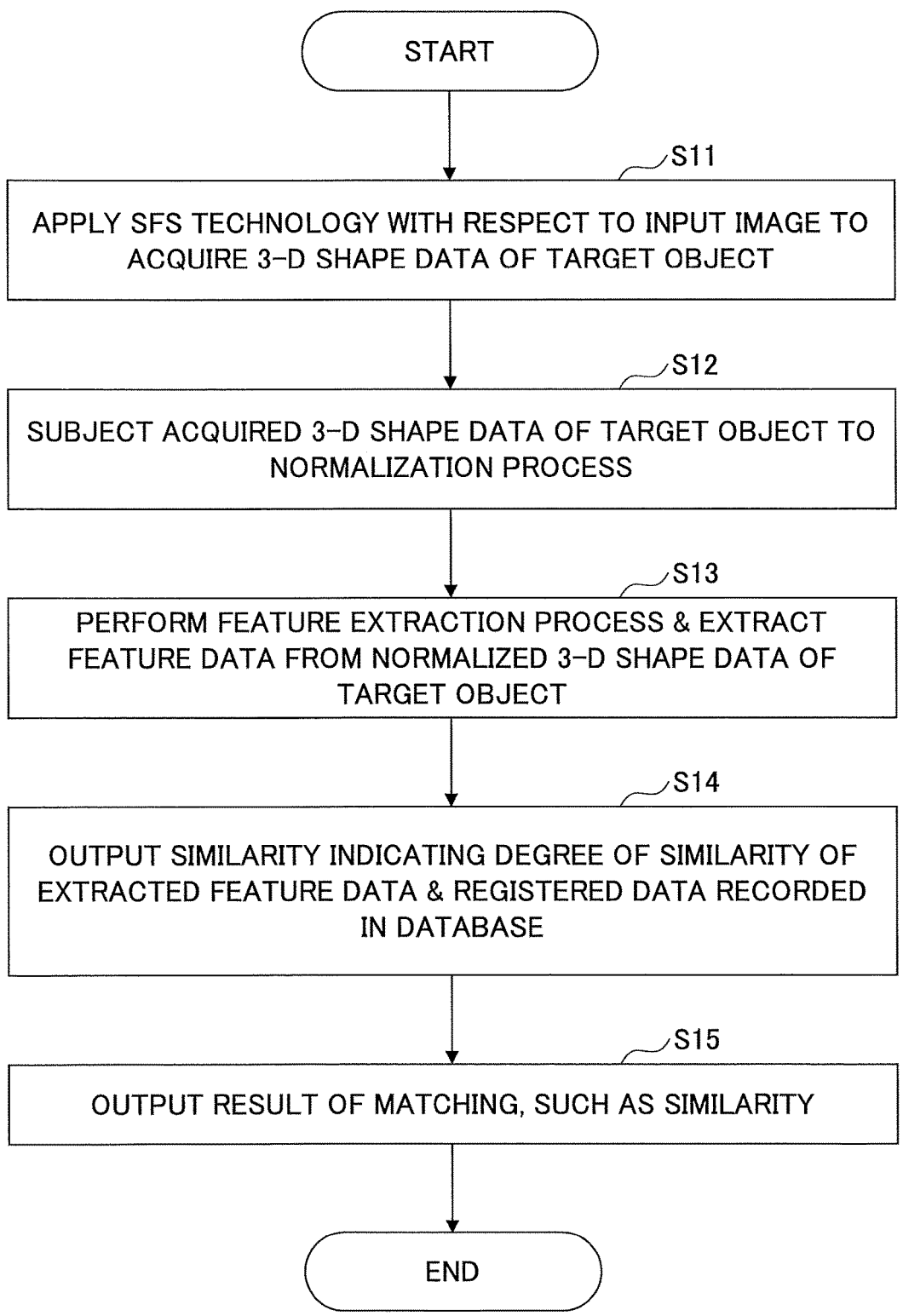
FIG. 8 is a flow chart for explaining an example of a matching process in one embodiment.

FIG. 8 is a flow chart for explaining an example of a matching process in one embodiment. The matching process illustrated in FIG. 8 may be performed by the CPU 11 illustrated in FIG. 1, for example.

In step S11 illustrated in FIG. 8, the CPU 11 applies a SFS technique corresponding to the known SFS technique by the SFS computation unit 25, with respect to the input image captured by the capturing device 22, and acquires the three-dimensional shape data of the target object. In step S12, the CPU 11 performs a normalization process corresponding to the normalization process of the normalization unit 28-1, with respect to the acquired three-dimensional shape data of the target object. In step S13, the CPU 11 performs a feature extraction process corresponding to the feature extraction process of the feature extraction unit 26, and extracts the feature data from the normalized three-dimensional shape data of the target object. In the normalization process, a distortion in the three-dimensional shape of the captured target object is corrected, and the corrected three-dimensional shape is expanded into the two-dimensional plane. In the case in which the target object is the user's palm, the normalization process in this example corrects both a total inclination of the palm and a rotation of the palm, however, only one of the total inclination and the rotation of the palm may be corrected instead. In step S14, the CPU 11 performs a matching process corresponding to the matching process of the matching unit 27, and outputs a similarity (or a matching extent) that indicates a degree of similarity of the extracted feature data and the registered feature data recorded in the database 23. In step S15, the CPU 11 outputs a result of the matching process, such as the similarity or the like, to the output device 14 illustrated in FIG. 1, and the matching process ends. The output device 14 may display the result of the matching process, such as the similarity of the like, for example.

[Normalization Process]

In one embodiment, the normalization process of step S12 illustrated in FIG. 8 applies a two-dimensional expansion process on the input image. In general, an image conversion process performs a process of obtaining coordinates (x, y) before the conversion, by taking coordinates (x', y') after the conversion, as a target point. This process is required because a coordinate point is represented by integer coordinate values. In other words, when the coordinates (x, y) before the conversion are regarded as the target point, the corresponding coordinates (x', y') after the conversion become real-number coordinates, and it is not possible to compute the image. For this reason, in general, the coordinates (x', y') after the conversion are regarded as the target point, and the corresponding coordinates (x, y) before the conversion are obtained. The coordinates (x, y) become real-number coordinates in general, but a luminance value at the coordinates can be computed by linear interpolation, bicubic interpolation, or the like.

Accordingly, this embodiment also performs a process by regarding a point (x', y') on the image after the two-dimensional expansion process, as the target point. First, a point X1 on a plane, corresponding to the point (x', y') on the image, is obtained. Then, a point X2 on a quadric surface, corresponding to the point X1, is computed by the process described above for computing the corresponding point. In addition, the coordinates (x, y) on the image, corresponding to the point X2, are obtained. A corrected image can be computed by setting the luminance value of the coordinates (x, y) of the input image to the coordinates (x', y') of the image after the correction.

Figure 9:
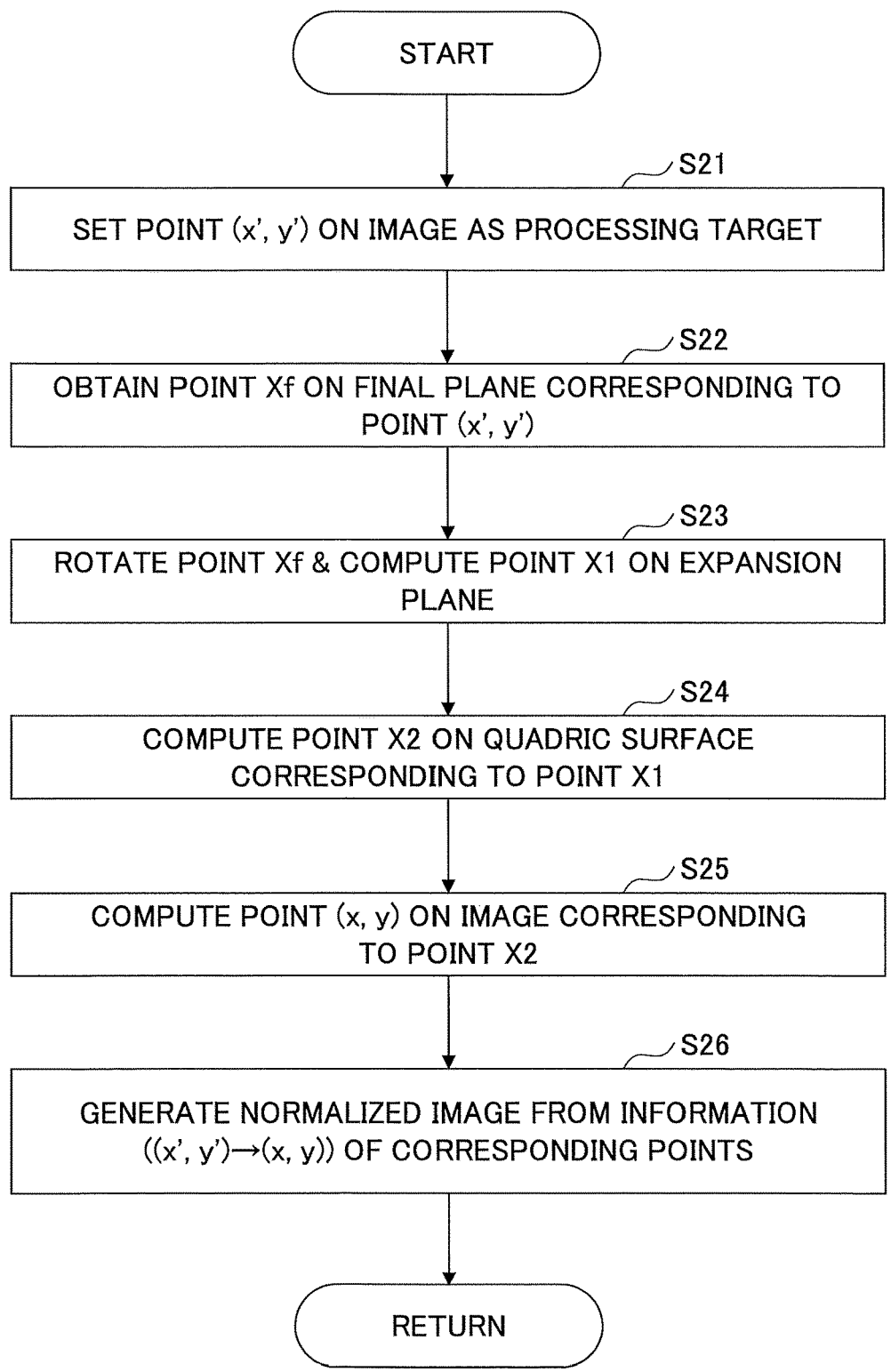
FIG. 9 is a flow chart for explaining an example of a normalization process.

FIG. 9 is a flow chart for explaining an example of a normalization process. The normalization process illustrated in FIG. 9 may be performed by the CPU 11 illustrated in FIG. 1, for example. In this embodiment, the two-dimensional expansion process is applied to the image of the target object captured by the capturing device 22 (that is, the input image).

In step S21 illustrated in FIG. 9, the CPU 11 sets the point (x', y') on the image, as a processing target. The point (x', y') is a coordinate data of the image after the two-dimensional expansion process. In step S22, the CPU 11 obtains a point Xf on the final plane, to which the point (x', y') corresponds. In step S23, the CPU 11 rotates the point Xf, and computes the point X1 on the expansion plane. In step S24, the CPU 11 computes the point X2 on the quadric surface corresponding to the point X1. In step S25, the CPU 11 computes the point (x, y) on the image corresponding to the point X2. In step S26, the CPU 11 generates a normalized image from information ((x', y')→(x, y)) of the corresponding points.

[Setting Final Plane]

A summary of the two-dimensional expansion process is as described above. Actually, in a case in which the target object is the palm, a process is required to correct the inclination of the entire palm. The process to correct the inclination of the entire palm corresponds to rotating the expansion plane, that is obtained by subjecting the quadric surface to the two-dimensional expansion, to the final plane that is a horizontal plane. More particularly, a rotation process is performed so that a normal vector of the expansion plane overlaps a unit vector (0, 0, 1) in a perpendicular direction.

[Correspondence Point Computation Process]

Figure 10:
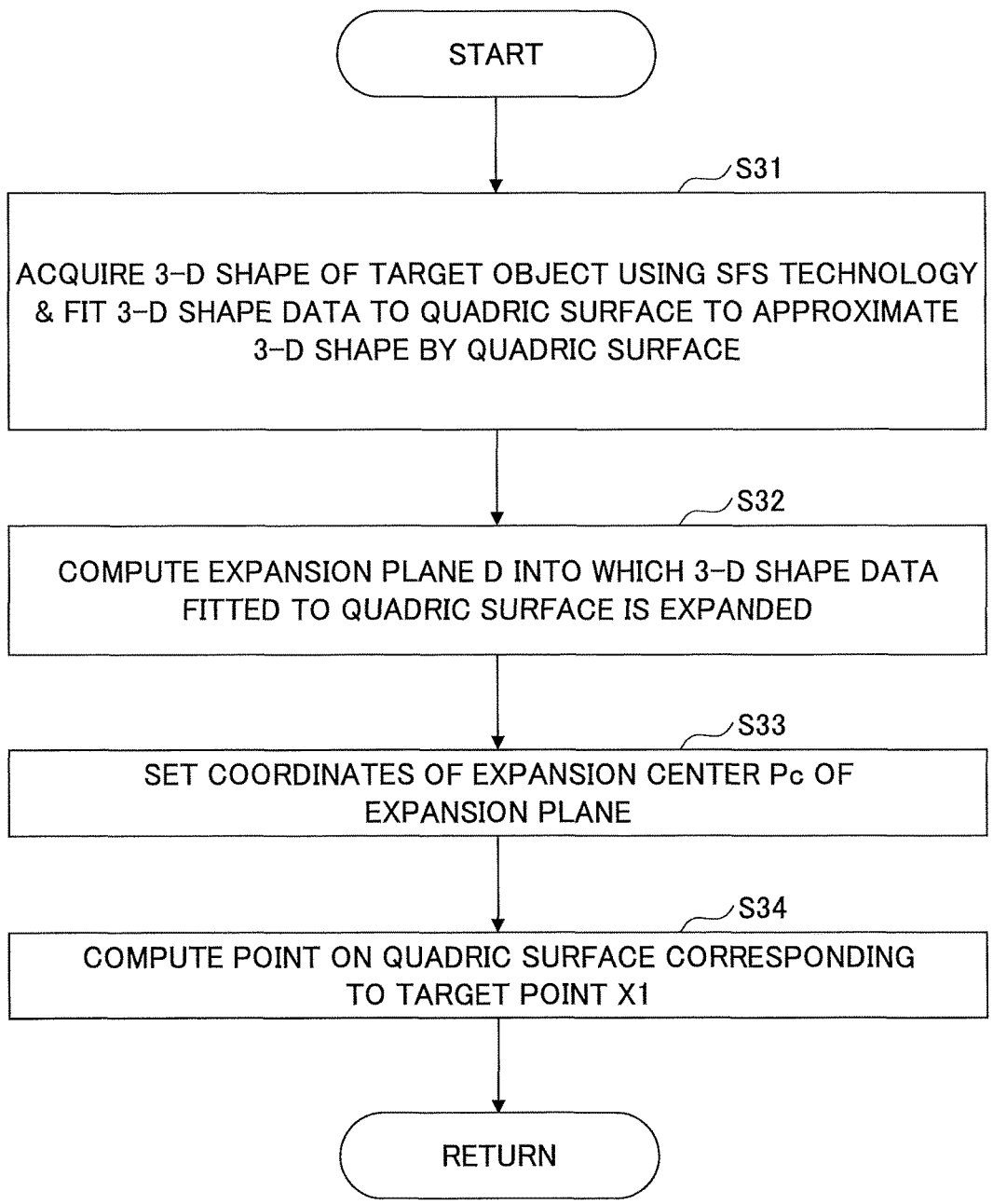
FIG. 10 is a flow chart for explaining an example of a corresponding point computation process.

Next, a description will be given of a corresponding point computation process in a first embodiment, by referring to FIG. 10. FIG. 10 is a flow chart for explaining an example of the corresponding point computation process, and corresponds to the process of step S24 illustrated in FIG. 9.

In step S31 illustrated in FIG. 10, the CPU 11 acquires the three-dimensional shape of the target object captured by the capturing device 22 using the SFS technique, and approximates the three-dimensional shape of the target object by a quadric surface (for example, the curved surface of the palm) T by fitting the three-dimensional shape data of the target object to the quadric surface T. For example, by defining the cross-sectional plane R and performing a process with respect to the points on the cross-sectional plane R, the three-dimensional shape data can be fitted to the quadric surface T. By fitting the three-dimensional shape data to the quadric surface T, it is possible to simplify the computation process, and efficiently perform computations on the normal vector or the like. In step S32, the CPU 11 computes the expansion plane D to which the three-dimensional shape data, fitted to the quadric surface T, is expanded. The expansion plane D may be set according to various setting methods. For example, it is possible to set the expansion plane D by utilizing a method that applies plane approximation to the three-dimensional shape data acquired using the SFS technique. In step S33, the CPU 11 sets the coordinates of the expansion center Pc of the expansion plane. The coordinates of the expansion center Pc become the center of the plane expansion process, and correspond to the center coordinates of the palm. The center coordinates of the palm are an example of reference point coordinates of the palm. The coordinates of the expansion center Pc may be set according to various methods. For example, the coordinates of the expansion center Pc may be set by a method which sets, as the coordinates of the expansion center Pc, coordinates of a contact point between the expansion plane and the palm that is fitted to the quadric surface T. In step S34, the CPU 11 computes a point on the quadric surface T corresponding to the target point X1. In a case in which the corresponding point is computed by the first corresponding point computation method described above in conjunction with FIG. 5 that uses the normal vector of the straight line, the CPU 11 in step S34 computes the point X2 on the quadric surface T corresponding to the target point X1. On the other hand, in a case in which the corresponding point is computed by the second corresponding point computation method described above with reference to FIG. 6 that uses the normal vectors of the straight line and the quadratic curve, the CPU 11 in step S34 computes the point X2' on the quadric surface T corresponding to the target point X1.

Figure 11:
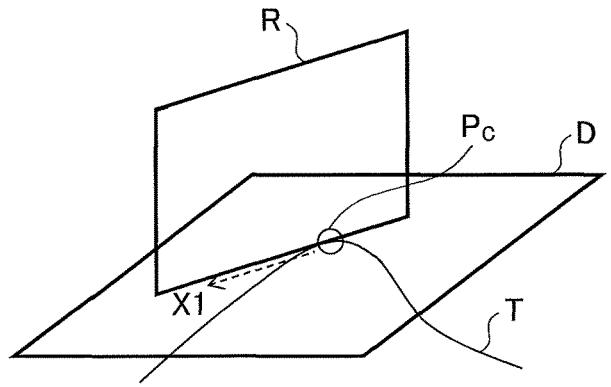
FIG. 11 is a diagram for explaining a corresponding point computation process when performing the plane expansion.

FIG. 11 is a diagram for explaining a corresponding point computation process when performing the plane expansion. In FIG. 11, those parts that are the same as those corresponding parts in FIG. 3 are designated by the same reference numerals, and a description thereof will be omitted. As illustrated in FIG. 11, for example, a vector that is perpendicular to a vector connecting the expansion center Pc and the target point X1 on the expansion plane D, and is also perpendicular to the normal vector of the expansion plane D, may be set as the normal vector of the cross-sectional plane R. Further, such a vector may be uniquely determined by setting a condition that the cross-sectional plane R passes through the coordinates of the expansion center Pc.

The process of obtaining the corresponding points by setting the cross-sectional plane R is a process in two dimensions. More particularly, such a process obtains the corresponding points on the quadratic curve (result of projecting the quadric surface T onto the cross-sectional plane R) and the straight line (result of projecting the expansion plane D onto the cross-sectional plane R).

Figure 12:
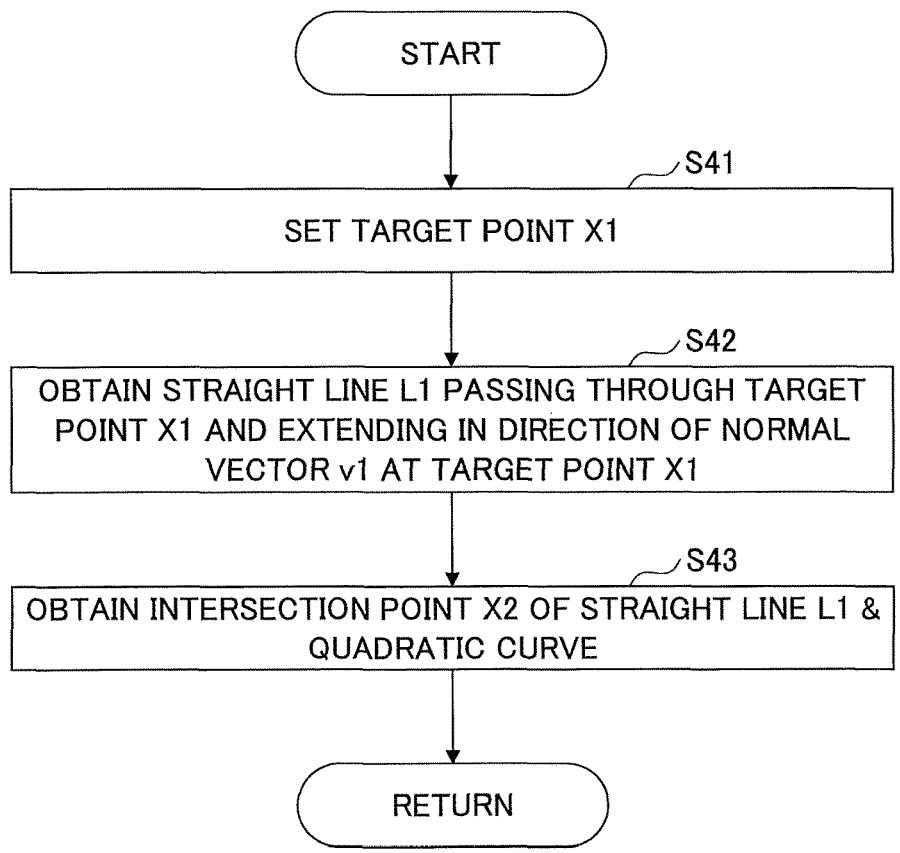
FIG. 12 is a flow chart for explaining an example of a computation process for a point corresponding to a target point.

FIG. 12 is a flow chart for explaining an example of a computation process for a point corresponding to a target point, and corresponds to the process of step S34 illustrated in FIG. 10 for the case in which the first corresponding point computation method described above is used. In step S41 illustrated in FIG. 12, the CPU 11 sets the target point X1. In step S42, the CPU 11 obtains a straight line L1 that passes through the target point X1, and extends in a direction of the normal vector v1 of the target point X1. In step S43, the CPU 11 obtains an intersection point X2 of the straight line L1 and the quadratic curve. Hence, the intersection point X2 that is obtained in this manner becomes the point corresponding to the target point X1.

Figure 13:
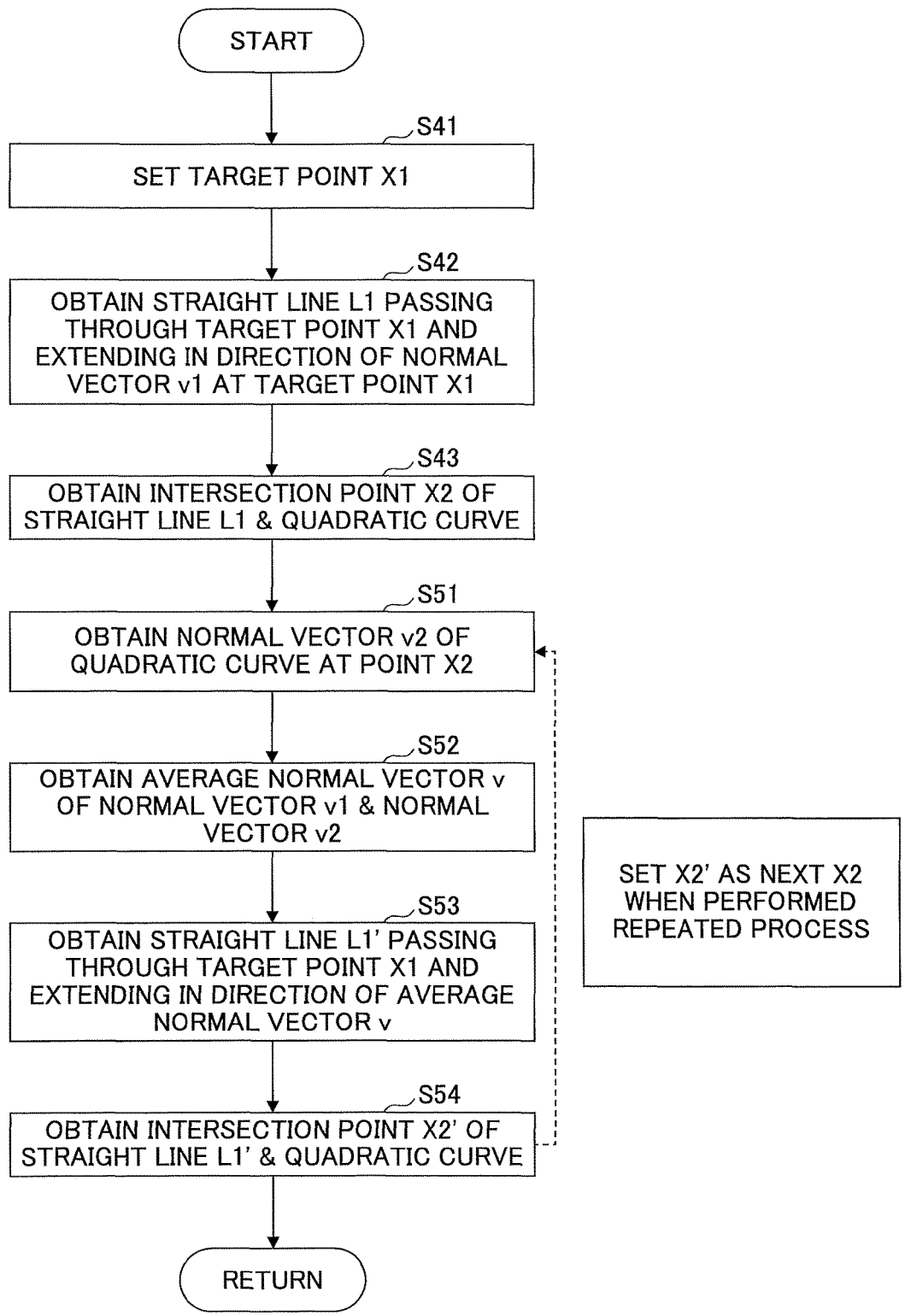
FIG. 13 is a flow chart for explaining another example of the computation process for the point corresponding to the target point.

FIG. 13 is a flow chart for explaining another example of the computation process for the point corresponding to the target point, and corresponds to the process of step S34 illustrated in FIG. 10 for the case in which the second corresponding point computation method described above is used. Steps S41 through S43 illustrated in FIG. 13 are the same as steps S41 through S43 illustrated in FIG. 12. In step S51 illustrated in FIG. 13, the CPU 11 obtains the normal vector v2 of the quadratic curve at the point X2. In step S52, the CPU 11 obtains an average normal vector v of the normal vector v1 and the normal vector v2. In step S53, the CPU 11 obtains a straight line L1' passing through the target point X1 and extending in a direction of the average normal vector v. In step S54, the CPU 11 obtains an intersection point X2' of the straight line L1' and the quadratic curve. Hence, the intersection point X2' that is obtained in this manner becomes the point corresponding to the target point X1.

In this example, each normal vector (that is, the curve and the straight line) is used once. However, the corresponding point computation process that uses the normal vector may be repeated. In this case, processes of steps S51 through S54 may be repeated. In this case, the corresponding point X2' that is obtained in step S54 may be used as the point X2 when performing the process of step S51 the next time. Such a repeated process may be performed a predetermined number of times. Further, the repeated process may be stopped in a case in which the coordinates of the point X2' computed the previous time and the current time are approximately the same (that is, in a case in which the distance L from the coordinates of the expansion center Pc is less than a threshold value). By performing the repeated process, it is possible to correctly obtain the average normal vector v of the curve and the straight line, and correct a distortion in the three-dimensional shape of the target object with a high accuracy, to enable a normalization with a high accuracy.

In this embodiment, the SFS computation unit 25 and the normalization unit 28-1 (more particularly, the quadric surface computation part 281) form an example of a device or a means for approximating the three-dimensional shape of the target object, acquired from the image of the target object, by the quadric surface. In addition, the normalization unit 28-1 (more particularly, the expansion plane computation part 282) forms an example of a device or a means for applying the plane expansion process that expands the quadric surface into an expansion plane, to data of the image. Further, the normalization unit 28-1 (more particularly, the corresponding point computation part 283) forms an example of a device or a means for computing the corresponding points before and after the plane expansion process. The normalization unit 28-1 (more particularly, the image formation part 286) forms an example of a device or a means for generating the normalized data of the image from the corresponding points that are computed. The device or the means for computing the corresponding points may compute the corresponding points, based on the point on the straight line of the expansion plane in contact with the point on the quadric surface and corresponding to a reference point on the target object, and the intersection point of a first imaginary straight line, passing through the point on the straight line and extending in the direction of a first normal vector with respect to the straight line, and a quadratic curve of the quadric surface. The device or the means for computing the corresponding points may include obtaining an average normal vector of the first normal vector, and a second normal vector with respect to the quadric surface and passing through the intersection point, and computing the corresponding points, based on the point on the straight line, and the intersection point of a second virtual straight line, passing through the point on the straight line and extending in a direction of the average normal vector, and the quadric curve of the quadric surface. The device or the means for applying the plane expansion process may apply the plane expansion process with respect to the image.

SECOND EMBODIMENT

Figure 14:
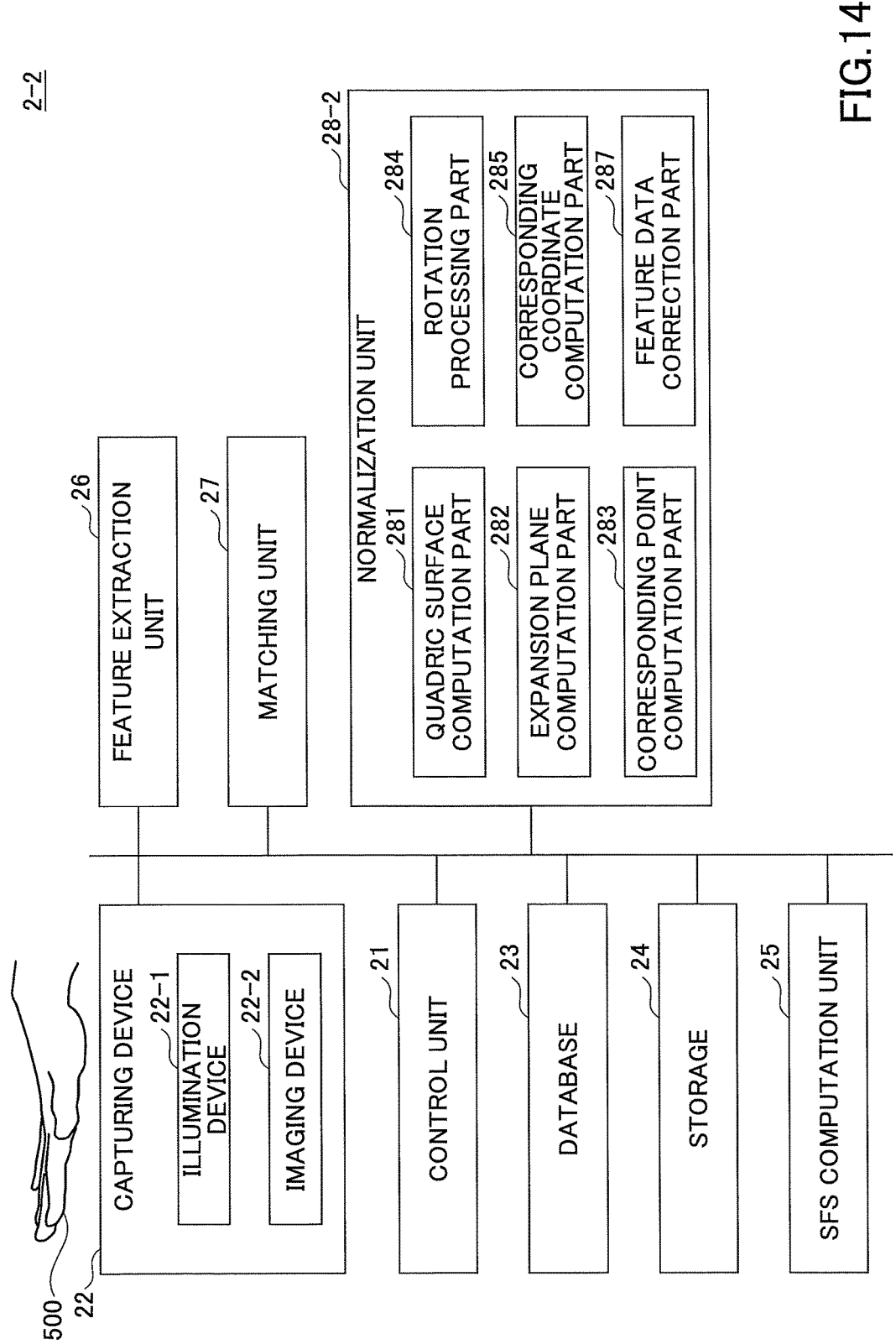
FIG. 14 is a block diagram illustrating an example of the configuration in a second embodiment.

FIG. 14 is a block diagram illustrating an example of the configuration in a second embodiment. In FIG. 14, those parts that are the same as those corresponding parts in FIG. 7 are designated by the same reference numerals, and a description thereof will be omitted. As illustrated in FIG. 14, a normalization unit 28-2 includes a feature data correction part 287 in place of the image formation part 286 illustrated in FIG. 7. The feature data correction part 287 computes the feature data after the correction, from the corresponding point information at the computed coordinates.

In the first embodiment described above, the plane expansion process is applied with respect to the image of the target image captured by the capturing device 22 (that is, the input image). On the other hand, in the second embodiment, the plane expansion process is applied with respect to the feature data that is extracted from the input image by the feature extraction unit 26. Accordingly, the matching unit 27 matches the feature data, subjected to the plane expansion process and corrected by the feature data correction part 287 of the normalization unit 28-2, and the registered feature data that are examples of the registered data recorded in the database 23. The matching unit 26 outputs a similarity (or a matching extent) that indicates a degree of similarity of the corrected feature data corrected by the feature data correction part 287 and the registered feature data recorded in the database 23.

It is possible to obtain an effect of reducing the amount of computations that are required, by applying the plane expansion process with respect to the feature data. In order to apply the plane expansion process to the input image, the plane expansion process needs to be applied to the entire input image. On the other hand, when applying the plane expansion process with respect to the feature data (for example, feature points on the vein of the palm), it is sufficient to apply the plane expansion process only with respect to the feature points on the vein of the palm, and it is possible to reduce the amount of computations that are required and to reduce the time required perform the computation process.

By applying the plane expansion process with respect to the feature data, it is also possible to obtain an effect of improving compatibility. When the registered feature data not applied with the plane expansion process and the feature data applied with the plane expansion process are matched, there are cases in which an authentication accuracy deteriorates. Hence, the feature data extraction process of the feature extraction unit 26 may be performed with respect to the input image not applied with the plane expansion process, and the plane expansion data, such as the quadric surface data or the like required for the plane expansion process, may be added as auxiliary data. In this case, when the plane expansion data are registered with respect to the registered feature data, and the plane expansion data with respect to the matching feature data is computed by the feature data correction part 287, it is possible to match the registered feature data after the plane expansion, obtained by subjecting the registered feature data to the plane expansion process using the plane expansion data, and the matching feature data after the plane expansion, obtained by subjecting the matching feature data to the plane expansion process using the plane expansion data.

Figure 15:
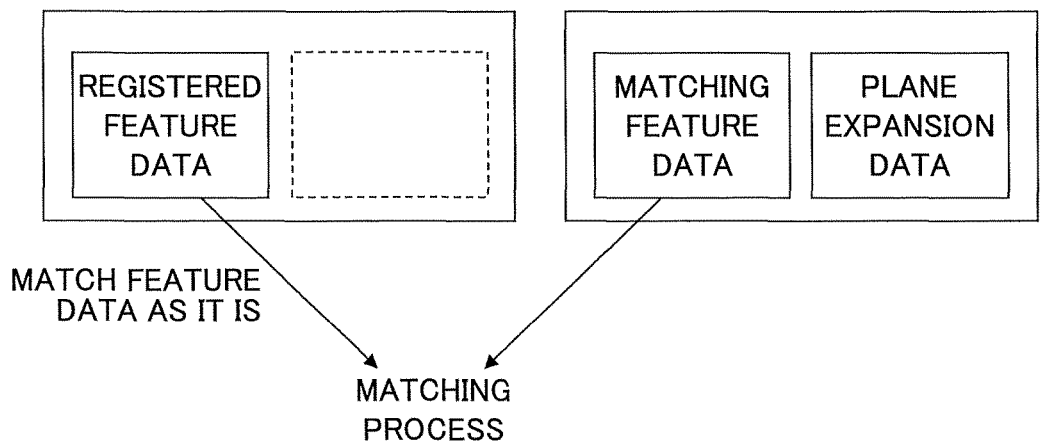
FIG. 15 is a diagram for explaining an example of a case in which the plane expansion process is applied to one of registered feature data and feature data.
Figure 16:
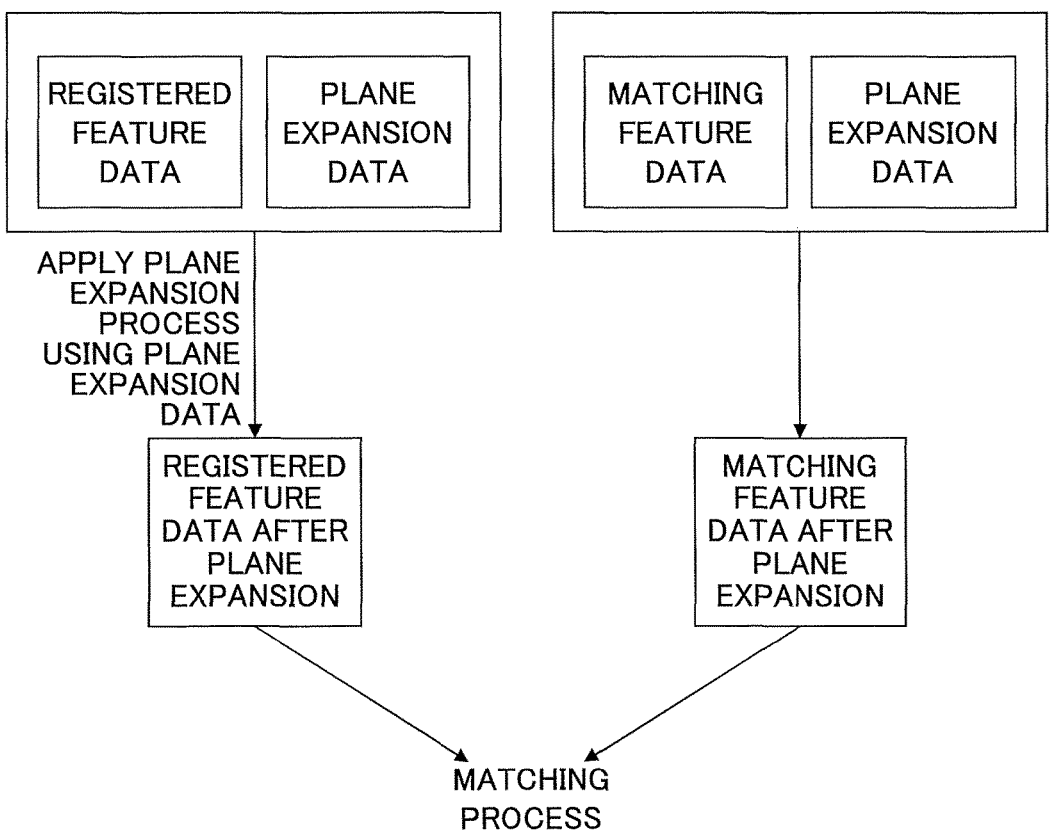
FIG. 16 is a diagram for explaining an example of a case in which the plane expansion process is applied to both the registered feature data and the feature data.

FIGS. 15 and 16 are diagrams for explaining examples of cases in which the plane expansion process is applied to the feature data. FIG. 15 is a diagram for explaining an example of the case in which the plane expansion process is applied to one of the registered feature data and the feature data, and FIG. 16 is a diagram for explaining an example of the case in which the plane expansion process is applied to both the registered feature data and the feature data.

In the example illustrated in FIG. 15, the plane expansion process is not applied to the registered feature data. In this case, regardless of whether the plane expansion data with respect to the matching feature data is computed by the feature data correction part 287, the matching unit 27 illustrated in FIG. 7 matches the matching feature data extracted by the feature extraction unit 26 from the input image normalized by the normalization unit 28-1, and the registered feature data recorded in the database 23, to output the similarity that indicates the degree of similarity of the feature data that are matched.

In the example illustrated in FIG. 16, the plane expansion process is applied to both the registered feature data and the matching feature data. In this case, the matching unit 27 illustrated in FIG. 14 matches the matching feature data after the plane expansion, obtained by extracting the feature data by the feature extraction unit 26, normalizing the feature data by the normalization unit 28-1, and subjecting the feature data to the plane expansion process by the feature data correction part 287, and the registered feature data after the plane expansion, obtained by subjecting the registered feature data recorded in the database 23 to the plane expansion process, to output the similarity that indicates the degree of similarity of the feature data that are matched. By recording both the registered feature data and the plane expansion data in the database 23, it becomes possible to use the database 23 also for the comparison of the matching feature data not applied with the plane expansion process to the registered feature data.

Accordingly, the matching unit 27 can output the similarity with a high accuracy, regardless of whether the registered feature data is applied with the plane expansion process. In other words, it is possible to obtain an effect of improving the authentication accuracy, while maintaining compatibility between the biometric authentication apparatus 2-2 having the database 23 recorded with the registered feature data applied with the plane expansion process and the biometric authentication apparatus 2-1 having the database 23 recorded with the registered feature data not applied with the plane expansion process.

The registered feature data recorded in the database 23 may be the registered feature data after the plane expansion, obtained by subjecting the registered feature data to the plane expansion process using the plane expansion data.

[Normalization Process with Respect to Feature Data]

According to the first embodiment and the second embodiment described above, the order in which the computation for the coordinate conversion is performed is different between the two. According to the second embodiment, the computation for the coordinate conversion is performed in an order that is in a reverse order to that performed in the first embodiment. More particularly, the second embodiment executes a loop, by regarding the coordinates (x, y) of the feature point of the input image before the correction, as the processing target.

Figure 17:
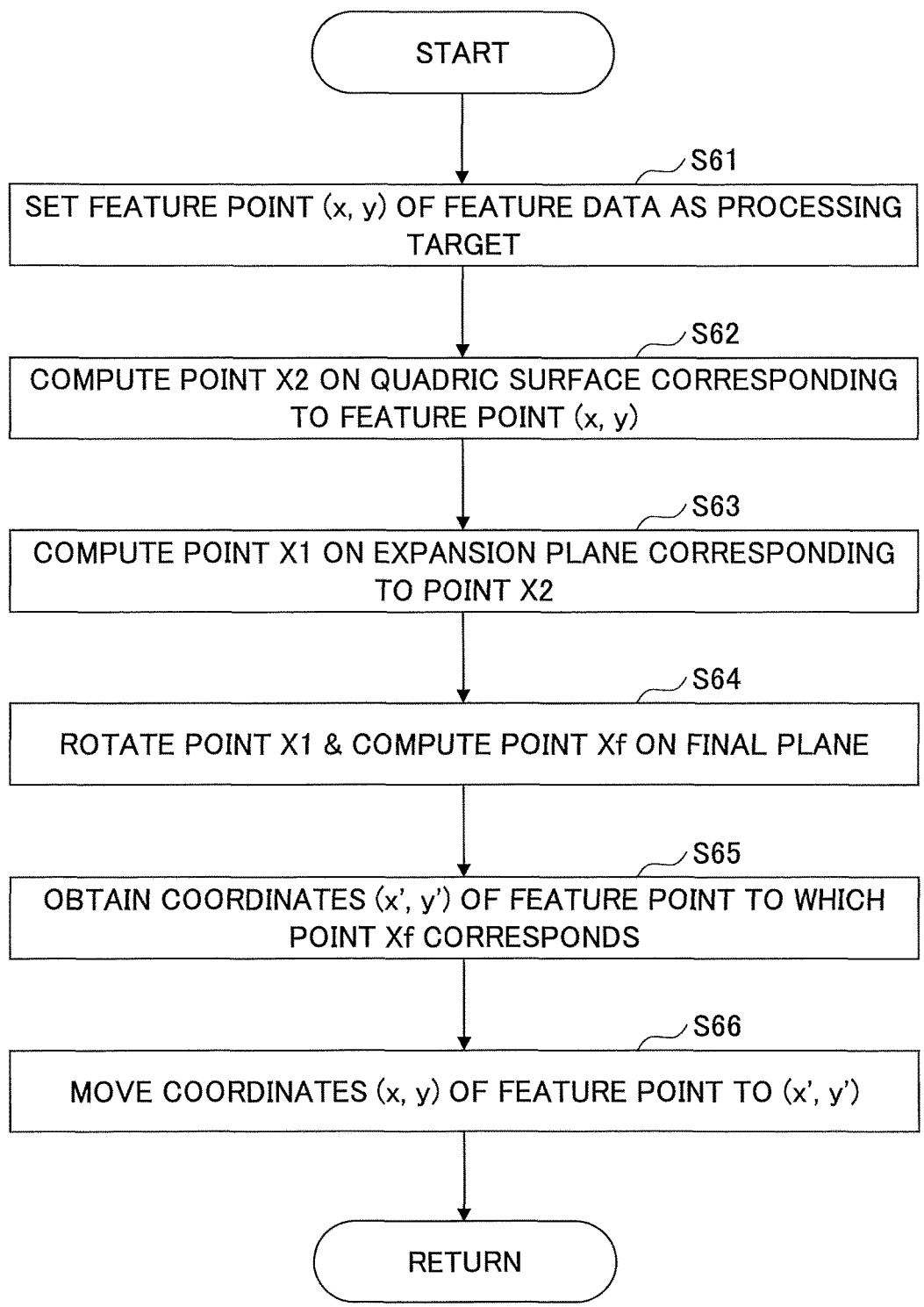
FIG. 17 is a flow chart for explaining an example of the normalization process with respect to the feature data.

FIG. 17 is a flow chart for explaining an example of the normalization process with respect to the feature data. The normalization process illustrated in FIG. 17 may be performed by the CPU 11 illustrated in FIG. 1, for example. In the second embodiment, the plane expansion process is applied to the feature data extracted from the image of the target object captured by the capturing device 22 (that is, the input image).

In step S61 illustrated in FIG. 17, the CPU 11 sets the feature point (x, y) of the feature data, as the processing target. In step S62, the CPU 11 computes the point X2 on the quadric surface corresponding to the feature point (x, y). In step S63, the CPU 11 computes the point X1 on the expansion plane corresponding to the point X2. In step S64, the CPU 11 rotates the point X1, and computes the point Xf on the final plane. In step S65, the CPU 11 obtains the coordinates (x', y') of the feature point to which the point Xf corresponds. In step S66, the CPU 11 generates the normalized feature data from the corresponding feature point information ((x, y)→(x', y')). More particularly, the CPU 11 in step S66 moves the coordinates (x, y) of the feature point to (x', y').

Accordingly, the coordinates (x', y') after the correction are obtained by applying the plane expansion process with respect to the coordinates (x, y) of the feature point before the correction. The feature data after the correction can be obtained by moving the feature point amongst the feature data, existing at the coordinates (x, y), to the coordinates (x', y'). In general, the values of the coordinates (x', y') are real numbers, but the real number values may be rounded to integer values.

[Corresponding Point Computation Process]

Figure 18:
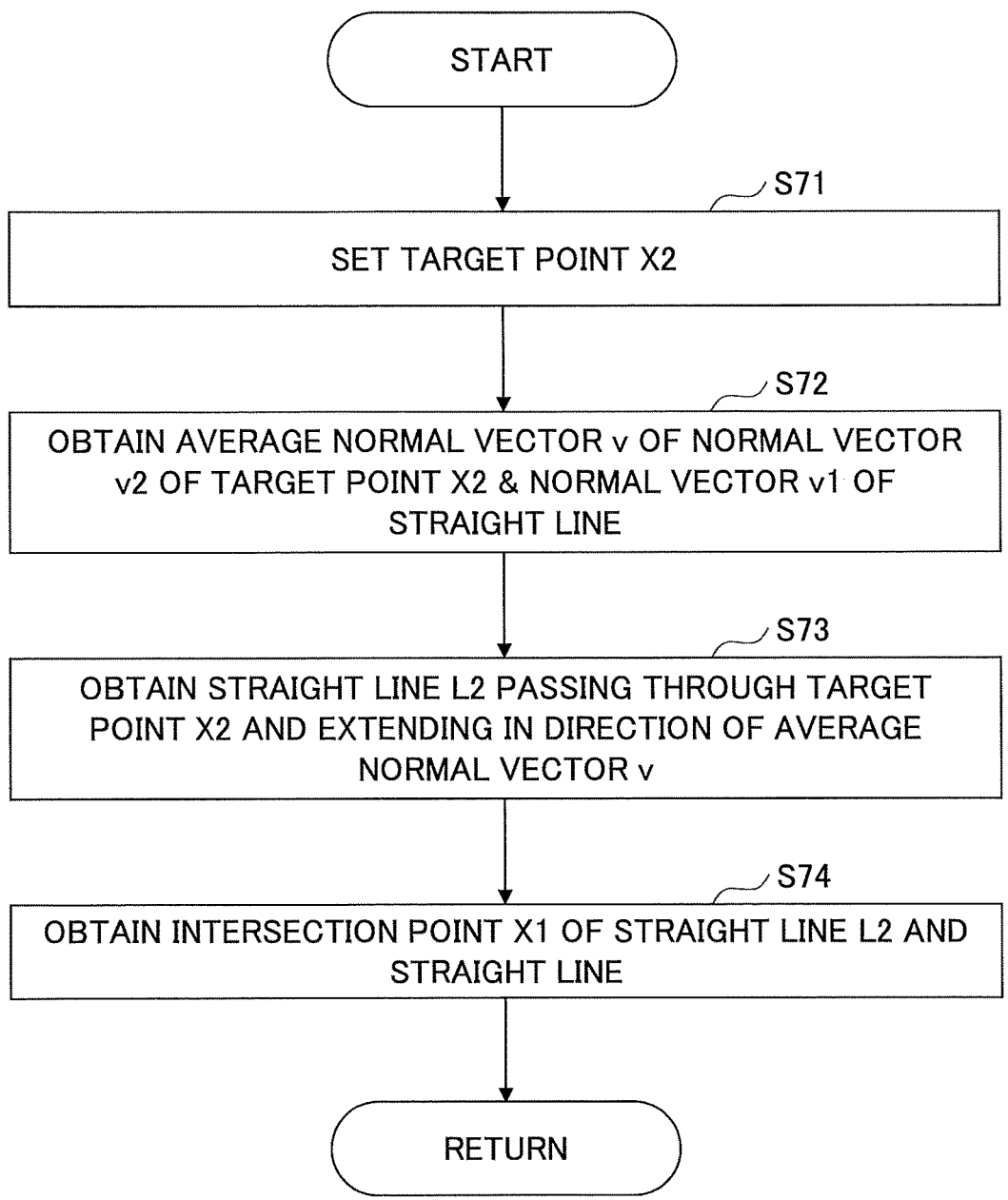
FIG. 18 is a flow chart for explaining an example of the corresponding point computation process.

Next, a description will be given of the corresponding point computation process of the second embodiment, by referring to FIG. 18. FIG. 18 is a flow chart for explaining an example of the corresponding point computation process, and corresponds to the process of step S63 illustrated in FIG. 17. In the second embodiment, the order of the process is in a reverse order to that performed in the first embodiment. In addition, because the normal vector of the straight line in the second embodiment has a common value v1 at all points, the second embodiment can simplify the computation process when compared to the first embodiment.

In step S71 illustrated in FIG. 18, the CPU 11 sets the target point X2. In step S72, the CPU 11 obtains the average normal vector v of the normal vector v2 of the target point X2 and the normal vector v1 of the straight line. In step S73, the CPU 11 obtains the straight line L2 that passes through the target point X2 and extends in the direction of the average normal vector v. In step S74, the CPU 11 obtains the intersection point X1 of the straight line L2 and the straight line. The intersection point X1 that is obtained in this manner becomes the point corresponding to the target point X2.

[Configuration to Directly Compute from Three-Dimensional Vector]

In the first embodiment and the second embodiment described above, when performing the corresponding point computation process, the cross-sectional plane R is set and the three-dimensional problem is reduced to two dimensions. However, the corresponding point computation process is not limited to such a computation process, and the corresponding point computation process may be applied directly with respect to the three-dimensional shape data. In other words, three-dimensional normal vectors may be obtained, and the corresponding points may be obtained from the three-dimensional normal vectors.

The corresponding point computation process of the second embodiment illustrated in FIG. 18 is simplified when compared to the corresponding point computation process of the first embodiment illustrated in FIG. 13. This is because, in the case of the second embodiment, the correspondence X2→X1 is obtained, however, the normal vectors of the plane (or the straight line) are always constant (=v1). In this case, the corresponding points may be computed using the three-dimensional normal vectors directly, without setting the cross-sectional plane R.

Figure 19:
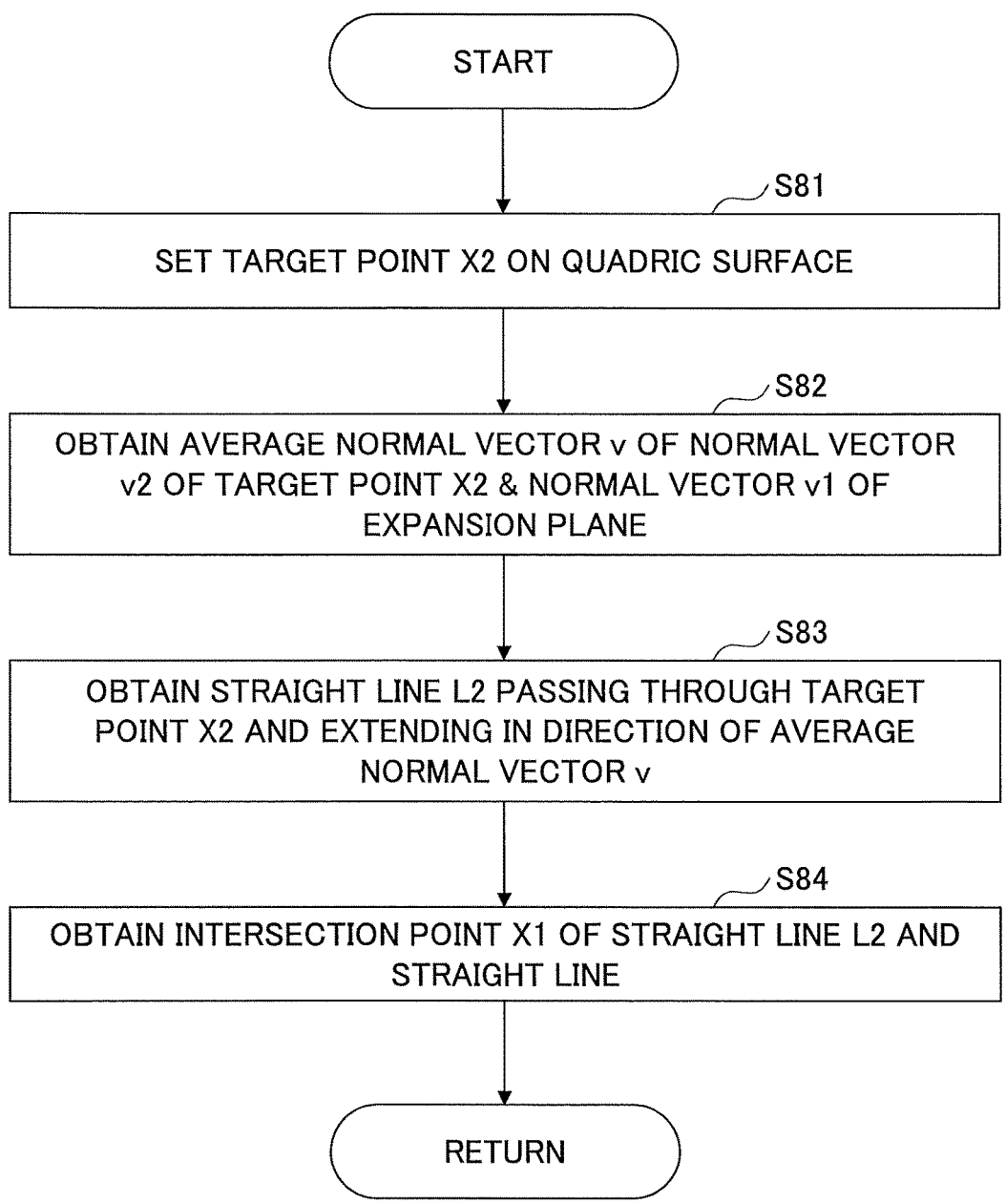
FIG. 19 is a flow chart for explaining another example of the corresponding point computation process.

FIG. 19 is a flow chart for explaining another example of the corresponding point computation process, and corresponds to the process of step S63 illustrated in FIG. 17. In step S81 illustrated in FIG. 19, the CPU 11 sets the target point X2 on the quadric curve. In step S82, the CPU 11 obtains an average normal vector v of the normal vector v2 of the target point X2 and the normal vector v1 of the expansion plane. In step S83, the CPU 11 obtains the straight line L2 that passes through the target point X2 and extends in the direction of the average normal vector v. In step S84, the CPU 11 obtains the intersection point X1 of the straight line L2 and the straight line. The intersection point X1 that is obtained in this manner becomes the point corresponding to the target point X2.

In this embodiment, the SFS computation unit 25 and the normalization unit 28-2 (more particularly, the quadric surface computation part 281) forms an example of a device or a means for approximating the three-dimensional shape of the target object, acquired from the image of the target object, by the quadric surface. In addition, the normalization unit 28-2 (more particularly, the expansion plane computation part 282) forms an example of a device or a means for applying the plane expansion process that expands the quadric surface into the expansion plane D, to the data of the image. Further, the normalization unit 28-2 (more particularly, the corresponding point computation part 283) forms an example of a device or a means for computing the corresponding points before and after the plane expansion process. The normalization unit 28-2 (more particularly, the feature data correction part 287) forms an example of a device or a means for generating the normalized data of the image from the corresponding points that are computed. The device or the means for computing the corresponding points may include obtaining the average normal vector of the first normal vector, and the second normal vector with respect to the quadric surface and passing through the intersection point, and computing the corresponding points, based on the point on the straight line, and the intersection of the second virtual straight line, passing through the point on the straight line and extending in the direction of the average normal vector, and the quadric curve of the quadric surface. The feature extraction unit 26 forms an example of a device or a means for extracting the feature data from the image, and in this embodiment, the device or the means for applying the plane expansion process applies the plane expansion process with respect to the feature data.

In each of the embodiments described above, the three-dimensional shape of the palm is acquired by using the SFS technique or the like, and the three-dimensional shape of the palm is thereafter approximated by the quadric surface and expanded into the plane. For this reason, even in the case of the closed, rounded palm or the excessively open, flat palm, it is possible to improve the authentication accuracy by expanding the three-dimensional shape of the palm into the plane. Particularly, by performing the plane expansion process at a high speed, it is possible to perform a smooth and quick authentication process even by use of a CPU having a lower computing power or processing capability compared to that of a PC. That is, in the corresponding point computation process that is performed when expanding the three-dimensional shape of the closed, rounded palm into the two-dimensional plane, the corresponding points can be computed using the normal vector, and the computation process can be performed at a high speed.

Accordingly, according to each of the embodiments described above, even in the case in which the user places the closed, rounded palm or the excessively open, flat palm to be captured for the palm authentication, it is possible to acquire, at a high speed, the image in which the three-dimensional shape of the palm is expanded into the plane. As a result, it is possible to improve the authentication accuracy. In the case in which the length on the curve is computed by the elliptic integral, considerable computational resource or cost is required. On the other hand, each of the embodiments described above obtains the corresponding points from the intersection point with the normal vector. Because the intersection point of the straight line and the quadratic curve can be obtained analytically from the quadratic equation, the computation process can be performed at a high speed. For example, in a case in which the palm vein authentication is applied to a device which monitors entry and exit of personnel into and out of a facility, for example, it is possible to obtain the effect of performing the high-speed computation process by implementing the image processing apparatus in the form of an embedded device.

According to each of the embodiments described above, it is possible to normalize the image of the target object by correcting, with a high accuracy, a distortion in the three-dimensional shape of the target object that is captured, not fully correctable by correcting the inclination or the rotation of the captured target object. Hence, according to each of the embodiments described above, it is possible to normalize the palm image by correcting, with a high accuracy, the distortion in the three-dimensional shape of the palm that is closed or excessively open and is captured at the time of the palm vein authentication. It is possible to also correct the distortion in the three-dimensional shape of the palm, which cannot be fully corrected by correcting the inclination or rotation of the palm. Accordingly, each of the embodiment may be suited for application to palm vein authentication, palm-print pattern authentication, palm-reading pattern authentication, or the like.

Although the embodiments are numbered with, for example, "first," or "second," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a storage configured to store a program; and
a processor configured to execute the program and perform a process including
fitting data of a three-dimensional shape of a target object in an image of the target object to a quadric surface, to approximate the three-dimensional shape by the quadric surface,
performing a plane expansion process on data of the image, to expand the quadric surface onto an expansion plane,
computing corresponding points of the image before and after the plane expansion process, and
correcting at least one of inclination and rotation of the target object, to generate normalized data of the image using the corresponding points that are computed,
wherein the computing the corresponding points computes the corresponding points including a point on a straight line located on the expansion plane that is in contact with a point on a quadratic curve of the quadric surface, a reference point on the target object, and an intersection point of a first imaginary straight line that passes through the point on the straight line and extends in a direction of a first normal vector that is perpendicular to the straight line, and
wherein the corresponding points respectively on the straight line located on the expansion plane and on the quadric curve located on the quadric surface are equidistant from an expansion center of the expansion plane, the expansion center of the expansion plane having coordinates corresponding to coordinates of a center of the target object.

2. The image processing apparatus as claimed in claim 1, wherein the computing the corresponding points includes
setting a cross-sectional plane when computing the corresponding points, and
computing a corresponding relationship between the quadric surface projected onto the cross-sectional plane and the straight line projected onto the cross-sectional plane.

3. The image processing apparatus as claimed in claim 1, wherein the computing the corresponding points includes
obtaining an average normal vector of the first normal vector, and a second normal vector with respect to the quadric surface and passing through the intersection point, and
computing the corresponding points, based on the point on the straight line, and the intersection of a second imaginary straight line, passing through the point on the straight line and extending in a direction of the average normal vector, and the quadric curve of the quadric surface.

4. The image processing apparatus as claimed in claim 1, wherein the performing the plane expansion process performs the plane expansion process on the image.

5. The image processing apparatus as claimed in claim 1, wherein the processor performs the process further including
extracting feature data from the image,
wherein the performing the plane expansion process performs the plane expansion process on the feature data.

6. The image processing apparatus as claimed in claim 1, wherein the fitting acquires the data of the three-dimensional shape of the target object from the data of the image of the target object using a Shape From Shading (SFS) technique.

7. The image processing apparatus as claimed in claim 1, further comprising:
a capturing device including an illumination device and an imaging device,
wherein the image of the object is an image of a palm illuminated by the illumination device and imaged by the imaging device.

8. An image processing method comprising:
fitting, by a computer, data of a three-dimensional shape of a target object in an image of the target object to a quadric surface, to approximate the three-dimensional shape by the quadric surface;
performing, by the computer, a plane expansion process on data of the image, to expand the quadric surface onto an expansion plane;
computing, by the computer, corresponding points before and after the plane expansion process; and
correcting, by the computer, at least one of inclination and rotation of the target object, to generate normalized data of the image using the corresponding points that are computed, wherein the computing the corresponding points computes the corresponding points including a point on a straight line located on the expansion plane that is in contact with a point on a quadratic curve of the quadric surface, a reference point on the target object, and an intersection point of a first imaginary straight line that passes through the point on the straight line and extends in a direction of a first normal vector that is perpendicular to the straight line, and wherein the corresponding points respectively on the straight line located on the expansion plane and on the quadric curve located on the quadric surface are equidistant from an expansion center of the expansion plane, the expansion center of the expansion plane having coordinates corresponding to coordinates of a center of the target object.

9. The image processing method as claimed in claim 8, wherein the computing the corresponding points includes
setting a cross-sectional plane when computing the corresponding points, and
computing a corresponding relationship between the quadric surface projected onto the cross-sectional plane and the straight line projected onto the cross-sectional plane.

10. The image processing method as claimed in claim 8, wherein the computing the corresponding points includes
obtaining an average normal vector of the first normal vector, and a second normal vector with respect to the quadric surface and passing through the intersection point, and
computing the corresponding points, based on the point on the straight line, and the intersection of a second imaginary straight line, passing through the point on the straight line and extending in a direction of the average normal vector, and the quadric curve of the quadric surface.

11. The image processing method as claimed in claim 8, wherein the performing the plane expansion process performs the plane expansion process on the image.

12. The image processing method as claimed in claim 8, further comprising:
extracting, by the computer, feature data from the image, wherein the performing the plane expansion process performs the plane expansion process on the feature data.

13. The image processing method as claimed in claim 8, wherein the fitting acquires the data of the three-dimensional shape of the target object from the data of the image of the target object using a Shape From Shading (SFS) technique.

14. The image processing method as claimed in claim 8, further comprising:
capturing the image of the object by a capturing device having an illumination device and an imaging device, wherein the image of the object is an image of a palm illuminated by the illumination device and imaged by the imaging device.

15. A non-transitory computer-readable storage medium having stored therein a program for causing a computer to execute a process comprising:
fitting data of a three-dimensional shape of a target object in an image of the target object to a quadric surface, to approximate the three-dimensional shape by the quadric surface;

performing a plane expansion process on data of the image, to expand the quadric surface onto an expansion plane;
computing corresponding points before and after the plane expansion process; and
correcting at least one of inclination and rotation of the target object, to generate normalized data of the image using the corresponding points that are computed,
wherein the computing the corresponding points computes the corresponding points including a point on a straight line located on the expansion plane that is in contact with a point on a quadratic curve of the quadric surface, a reference point on the target object, and an intersection point of a first imaginary straight line that passes through the point on the straight line and extends in a direction of a first normal vector that is perpendicular to the straight line, and
wherein the corresponding points respectively on the straight line located on the expansion plane and on the quadric curve located on the quadric surface are equidistant from an expansion center of the expansion plane, the expansion center of the expansion plane having coordinates corresponding to coordinates of a center of the target object.

16. The non-transitory computer-readable storage medium as claimed in claim 15, wherein the computing the corresponding points includes
setting a cross-sectional plane when computing the corresponding points, and
computing a corresponding relationship between the quadric surface projected onto the cross-sectional plane and the straight line projected onto the cross-sectional plane.

17. The non-transitory computer-readable storage medium as claimed in claim 15, wherein the computing the corresponding points includes
obtaining an average normal vector of the first normal vector, and a second normal vector with respect to the quadric surface and passing through the intersection point, and
computing the corresponding points, based on the point on the straight line, and the intersection of a second imaginary straight line, passing through the point on the straight line and extending in a direction of the average normal vector, and the quadric curve of the quadric surface.

18. The non-transitory computer-readable storage medium as claimed in claim 15, wherein the performing the plane expansion process performs the plane expansion process on the image.

19. The non-transitory computer-readable storage medium as claimed in claim 15, wherein the program causes the computer to execute the process further comprising:
extracting feature data from the image,
wherein the performing the plane expansion process performs the plane expansion process on the feature data.

20. The non-transitory computer-readable storage medium as claimed in claim 15, wherein the image of the object is an image of a palm captured by a capturing device.

* * * * *